US012300212B2

(12) United States Patent
Hsu et al.

(10) Patent No.: US 12,300,212 B2
(45) Date of Patent: May 13, 2025

(54) ACTIVE NOISE CANCELLATION INTEGRATED CIRCUIT FOR STACKING AT LEAST ONE ANTI-NOISE SIGNAL AND AT LEAST ONE NON-ANTI-NOISE SIGNAL, ASSOCIATED METHOD, AND ACTIVE NOISE CANCELLATION HEADPHONE USING THE SAME

(71) Applicant: Airoha Technology Corp., Hsinchu (TW)

(72) Inventors: Chao-Ling Hsu, Hsinchu County (TW); Li-Wen Chi, Hsinchu County (TW); Kai-Sheng Chen, Hsinchu County (TW)

(73) Assignee: Airoha Technology Corp., Hsinchu (TW)

( * ) Notice: Subject to any disclaimer, the term of this patent is extended or adjusted under 35 U.S.C. 154(b) by 110 days.

(21) Appl. No.: 18/211,288

(22) Filed: Jun. 19, 2023

(65) Prior Publication Data

US 2023/0335104 A1 Oct. 19, 2023

Related U.S. Application Data

(63) Continuation-in-part of application No. 17/699,631, filed on Mar. 21, 2022, now Pat. No. 11,721,315.

(Continued)

(30) Foreign Application Priority Data

Oct. 22, 2021 (CN) ......................... 202111233417.9

(51) Int. Cl.
*G10K 11/178* (2006.01)

(52) U.S. Cl.
CPC .. *G10K 11/17853* (2018.01); *G10K 11/17881* (2018.01); *G10K 2210/1081* (2013.01)

(58) Field of Classification Search
CPC ......... G10K 11/17885; G10K 11/1787; G10K 11/17875; G10K 11/17827; G10K 11/17825
See application file for complete search history.

(56) References Cited

U.S. PATENT DOCUMENTS 9,578,415 B1 * 2/2017 Zhou ................ G10K 11/17853
2019/0373379 A1 12/2019 Aschoff
(Continued)

FOREIGN PATENT DOCUMENTS

CN 108140380 A 6/2018
CN 108156546 B 11/2019
(Continued)

*Primary Examiner* — Kile O Blair
(74) *Attorney, Agent, or Firm* — Winston Hsu

(57) ABSTRACT

The present invention relates to an active noise cancellation integrated circuit for stacking at least one anti-noise signal and at least one non-anti-noise signal, an associated method, and an active noise cancellation headphone using the same. The method is applicable to an audio playback device with at least one ANC filtering unit and at least one non-ANC filtering unit. The method includes: acquiring a non-anti-noise signal from a non-ANC filtering unit; generating a decoupled signal by processing the non-anti-noise signal with the transfer function of a physical channel and operations of an ANC filtering unit; performing a signal superposition, wherein an anti-noise signal from the ANC filtering unit is superposed with the decoupled signal; and performing an audio playback based on the superposed signal and an audio signal such that noise is eliminated.

20 Claims, 17 Drawing Sheets

Related U.S. Application Data

(60) Provisional application No. 63/469,809, filed on May 30, 2023.

(56) References Cited

U.S. PATENT DOCUMENTS

| | | | |
|---|---|---|---|
| 2020/0005758 | A1 | 1/2020 | Hutchinson |
| 2021/0304725 | A1 | 9/2021 | Kannan |
| 2023/0131573 | A1 | 4/2023 | Hsu |

FOREIGN PATENT DOCUMENTS

| | | | |
|---|---|---|---|
| TW | 201638930 | A | 11/2016 |
| TW | 202021375 | A | 6/2020 |
| TW | I802055 | B | 5/2023 |
| WO | 2017/029550 | A1 | 2/2017 |

* cited by examiner

ACTIVE NOISE CANCELLATION INTEGRATED CIRCUIT FOR STACKING AT LEAST ONE ANTI-NOISE SIGNAL AND AT LEAST ONE NON-ANTI-NOISE SIGNAL, ASSOCIATED METHOD, AND ACTIVE NOISE CANCELLATION HEADPHONE USING THE SAME

CROSS REFERENCE TO RELATED APPLICATIONS

This application is a continuation-in-part of U.S. application Ser. No. 17/699,631, filed on Mar. 21, 2022, and further claims the benefit of U.S. Provisional Application No. 63/469,809, filed on May 30, 2023. The content of these applications is incorporated herein by reference.

BACKGROUND OF THE INVENTION

1. Field of the Invention

The disclosure generally relates to a noise cancellation technology, more particularly, to an active noise cancellation integrated circuit for stacking at least one anti-noise signal and at least one non-anti-noise signal, an associated method, and an active noise cancellation headphone using the same.

2. Description of the Prior Art

General noise reduction techniques for headphones include passive noise cancellation (PNC) and active noise cancellation (ANC) The passive noise cancellation mainly isolate noise as much as possible through headphone sound-insulation materials or special structures, which generally are in-ear headphones or over-ear headphones. Wearing these two-types headphones for a long period of time cause ear pain, and excessive sound pressure may even cause users' hearing loss. The active noise cancellation means that a special noise cancellation circuit is set in headphones. Generally, an audio receiver (such as a miniature microphone) and an anti-noise output chip are used to receive and analyze frequency of external noise and generate an anti-noise sound in inverted phase. By the destructive interference, the external noise would be canceled.

Further, the active noise cancellation (ANC) generally includes feed-forward ANC, feedback ANC and hybrid ANC. Regarding the feed-forward ANC, a noise receiving microphone is disposed outside of headphones for receiving noise outside the headphone, and an anti-noise signal is generated by a digital signal processing integrated circuit. Regarding the feedback ANC, a noise receiving microphone is disposed inside headphones for receiving audio in ear canals, and an anti-noise signal is generated by feedback the audio to the digital signal processing integrated circuit. In addition, the hybrid ANC uses two or more noise receiving microphones to pick up noises, and generates multiple anti-noise signals through different digital signal processing integrated circuits, respectively, and stacks the anti-noise signals to eliminate noises.

SUMMARY OF THE INVENTION

Since audio waves are generated by signals from multiple microphones disposed on different positions and by different signal process, an end observation point receives the superposition of multiple audio waves, which leads to undesired compensation such that a user may hear degraded audio playback. In view of this, how to reduce or eliminate the above-mentioned deficiencies in related field is a problem to be solved.

The present invention provides an active noise cancellation headphone, the active noise cancellation headphone includes an audio-to-electrical signal conversion device and an active noise cancellation integrated circuit for stacking at least one anti-noise signal and at least one non-anti-noise signal of the present invention. The active noise cancellation integrated circuit for stacking at least one anti-noise signal and at least one non-anti-noise signal includes a first path, a second path and a first decoupling unit, wherein the first path outputs a first path non-anti-noise signal, wherein the first path non-anti-noise signal is converted to a first signal by a physical channel, wherein the first path includes a non-ANC filtering unit for generating a non-anti-noise signal, wherein the second path receives the error signal which includes a component of the first signal, and outputs a second path anti-noise signal to the physical channel, wherein the second path includes an ANC filtering unit for generating an anti-noise signal, wherein the second path anti-noise signal is derived from the anti-noise signal. The first decoupling unit is for removing the component of the first signal from the second path based on the non-anti-noise signal.

The present invention further provides an active noise cancellation (ANC) method for stacking at least one anti-noise signal and at least one non-anti-noise signal, adapted for an audio playback device with at least one ANC filter and at least one non-ANC filter. The active noise cancellation method for stacking at least one anti-noise signal and at least one non-anti-noise signal includes: providing a first path outputting a first path non-anti-noise signal, wherein the first path non-anti-noise signal is converted to a first signal by a physical channel, wherein the first path includes a non-ANC filtering unit, for generating a non-anti-noise signal; providing a second path receiving an error signal including a component of the first signal, and outputting a second path anti-noise signal to the physical channel, wherein the second path includes an ANC filtering unit for generating an anti-noise signal, wherein the second path anti-noise signal is derived from the anti-noise signal; removing the component of the first signal from the second path based on the non-anti-noise signal; and performing playback based on the first path non-anti-noise signal and the second path anti-noise signal to eliminate noise.

The spirit of the present invention is to set at least one ANC filtering unit and at least one non-ANC filtering unit in the active noise cancellation apparatus of the active noise cancellation headphone. Moreover, the redundant component (s) generated from the output signal of the active noise cancellation filtering unit is/are canceled by the decoupling method. Thus, with the help of the proposed decoupling technique, the intended purpose of the non-ANC filter, such as hearing aid, pass-through, or personal sound amplification, can be achieved by mitigating or suppressing the side effect caused by the ANC filter.

The other advantages of the present invention will be explained in more detail in conjunction with the following description and drawings.

Both the foregoing general description and the following detailed description are examples and explanatory only, and are not restrictive of the invention as claimed.

These and other objectives of the present invention will no doubt become obvious to those of ordinary skill in the art after reading the following detailed description of the preferred embodiment that is illustrated in the various figures and drawings.

DETAILED DESCRIPTION

Reference is made in detail to embodiments of the invention, which are illustrated in the accompanying drawings. The same reference numbers may be used throughout the drawings to refer to the same or like parts, components, or operations.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, components, and/or components, but do not preclude the presence or addition of one or more other features, integers, steps, operations, components, components, and/or groups thereof.

Use of ordinal terms such as "first", "second", "third", etc., in the claims to modify a claim component does not by itself connote any priority, precedence, or order of one claim component over another or the temporal order in which acts of a method are performed, but are used merely as labels to distinguish one claim component having a certain name from another component having the same name (but for use of the ordinal term) to distinguish the claim components.

It will be understood that when a component is referred to as being "connected" or "coupled" to another component, it can be directly connected or coupled to the other component or intervening components may be present. In contrast, when a component is referred to as being "directly connected" or "directly coupled" to another component, there are no intervening components present. Other words used to describe the relationship between components should be interpreted in a like fashion (e.g., "between" versus "directly between," "adjacent" versus "directly adjacent." etc.)

Figure 1:
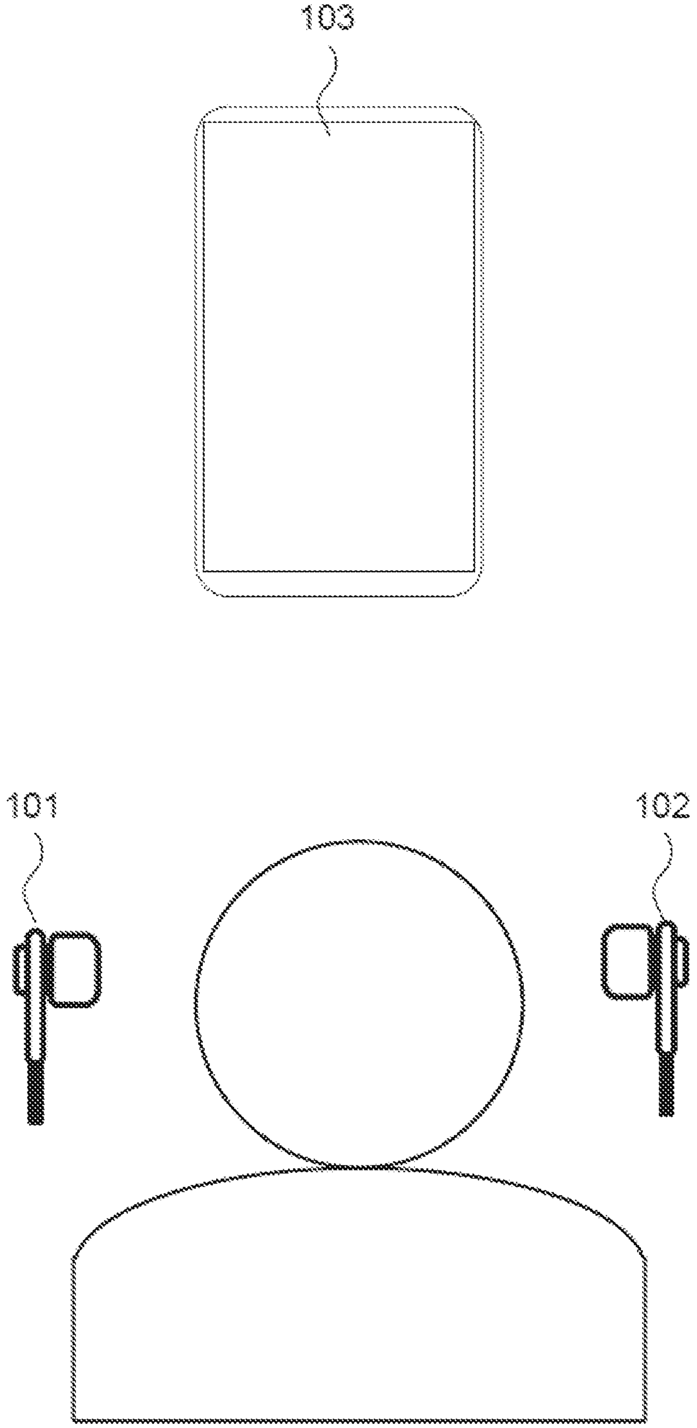
FIG. 1 illustrates a diagram depicting active noise cancellation headphones according to a preferred embodiment of the present invention.

FIG. 1 illustrates a diagram depicting active noise cancellation headphones according to a preferred embodiment of the present invention. Referring to FIG. 1, in this embodiment, wireless headphones are served as an example. The wireless headphones are a pair of devices with wireless communication function, which includes a left wireless earbud 101 and a right wireless earbud 102. There is no physical wire connecting between the left wireless earbud 101 and the right wireless earbud 102. A wireless communication protocol, such as A2DP (advanced audio distribution profile) Bluetooth package, can be used to transmit the user's speech signal or music package between the mobile device 103 and the left wireless earbud 101 and between the mobile device 103 and the right wireless earbud 102.

In other embodiments, other peer-to-peer methods such as Wi-Fi Direct, can also be used between the mobile device 103 and the left wireless earbud 101 and between the mobile device 103 and the right wireless earbud 102, the present invention is not limited thereto.

In the abovementioned embodiment, although wireless headphones are taken as an example of active noise cancellation headphones, people having ordinary skill in the art should know that active noise cancellation headphones may also be wired headphones, and the present invention is not limited thereto.

Figure 2:
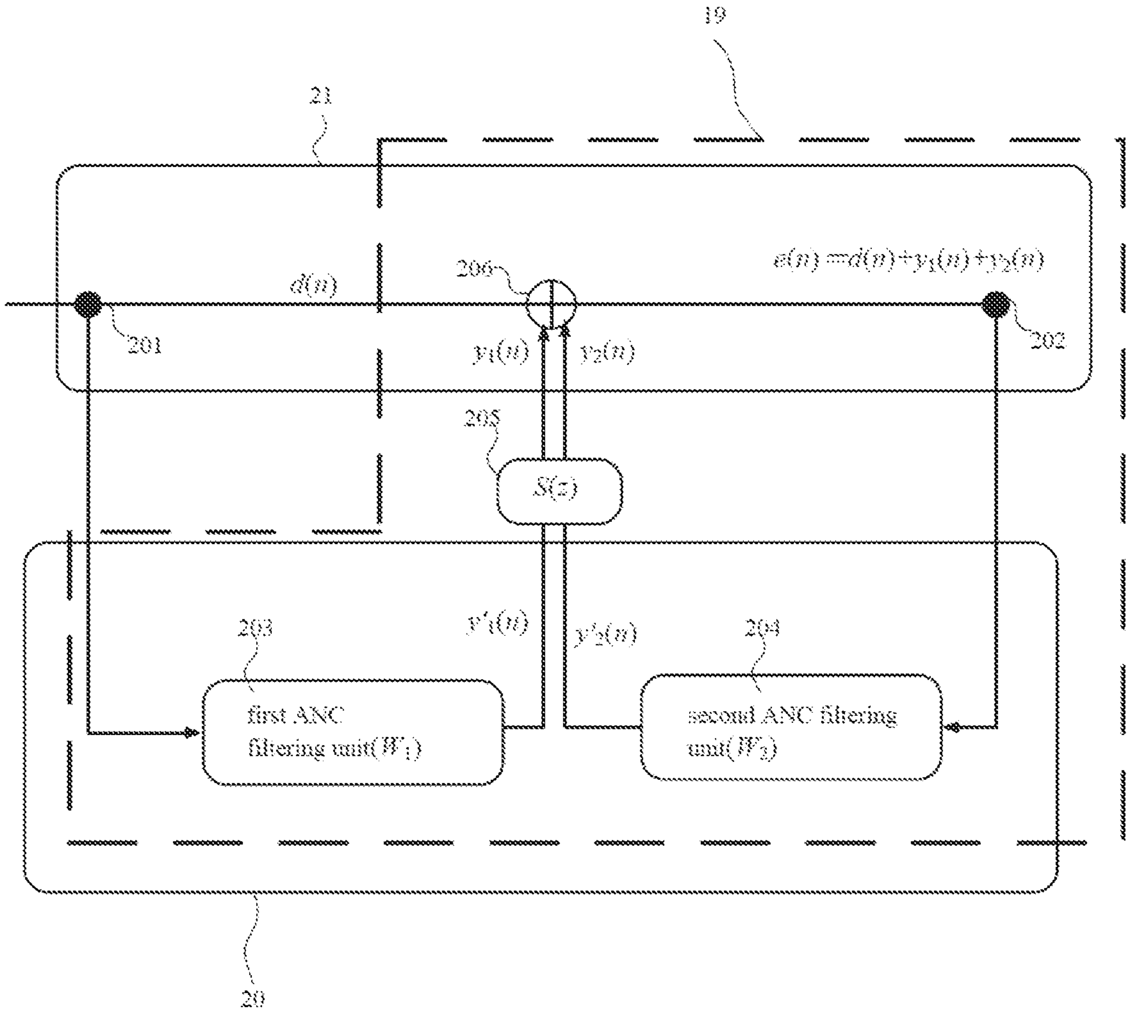
FIG. 2 illustrates a block diagram depicting an equivalent sampling time of an active noise cancellation headphone according to a preferred embodiment of the present invention.

FIG. 2 illustrates a block diagram depicting an equivalent sampling time of an active noise cancellation headphone according to a preferred embodiment of the present invention. Referring to FIG. 2, in this embodiment, the active noise cancellation headphone takes in-ear headphones as an example. The active noise cancellation headphone includes the active noise cancellation integrated circuit 20 and the audio-to-electrical signal conversion device 21. The audio-to-electrical signal conversion device 21 in this embodiment includes a first microphone 201, a second microphone 202 and a speaker (not shown). In the embodiment of the present invention, for the purpose of illustrating the spirit of the present invention, a dashed outer frame is used as an example for illustration, and the inside of the dashed outer frame indicates the inside of a headphone shell 19. The first microphone 201 is on the outside of the dashed outer frame, it means that the first microphone 201 is disposed outside an ear canal to receive noise outside the ear canal. The second microphone 202 is inside the dashed outer frame, it means that the second microphone 202 is disposed in the ear canal. In the following embodiments, the dashed outer frame is used as an illustration. However, the dashed outer frame cannot be utilized for limiting the configuration of the components of the present invention.

The first microphone 201 is disposed outside the headphone shell 19, and is mainly used for receiving an external noise signal of the in-ear headphone. The external noise signal captured by the first microphone 201 is, for example, to be sampled and applied with analog-to-digital conversion. After that, the external noise signal is converted into an electrical signal and the electrical signal is input to the active noise cancellation integrated circuit 20. The first microphone 201 may be referred to as the reference microphone.

The second microphone 202 is disposed inside the headphone shell 19 and is located between the headphone shell 19 and an eardrum, and is mainly used to receive noises and echoes in a user's ear canal, that is, the ear canal echo. The headphone shell 19 is used to provide passive noise cancellation. For example, the headphone shell 19 includes material of sound insulation component. More specifically, the second microphone 202 is used to receive an audio signal in user's ear canal. The audio signal captured by the second microphone 202 would be converted into an electrical signal which is input to a second ANC filtering unit 204. The second microphone 202 may be served as an error microphone.

The active noise cancellation integrated circuit 20 is used for generating an anti-noise electrical signal based on the electrical signal obtained by the first microphone 201 and the electrical signal obtained by the second microphone 202. For example, the anti-noise electrical signal in digital form is converted into an anti-noise audio signal sequentially through a digital-to-analog converter (DAC), a reconstruction filter, a power amplifier and a speaker. For analysis, the aforementioned conversion would be represented as a transfer function. In brief, the anti-noise electrical signal is converted into the anti-noise audio signal in audio form through the transfer function according to the aforementioned transmission. Accordingly, in order to evaluate the transfer function of the aforementioned transmission, it is necessary to involve the anti-noise electrical signal and the anti-noise audio signal into analysis.

However, the anti-noise audio signal in audio form cannot be directly obtained in practice. A possible alternative is to receive the anti-noise audio signal through the second microphone 202 in the absence of an external noise signal, and to convert the anti-noise audio signal into another analog electrical signal in analog form. The analog electrical signal is further converted into an electrical signal in digital form, for example, sequentially through a preamplifier, an anti-aliasing filter and an analog-to-digital converter, wherein the said electrical signal in digital form is used to replace the anti-noise audio signal in audio form to evaluate the transfer function.

Although the transfer function obtained in the alternative way involves not only the transmission path from the active noise cancellation integrated circuit 20 to an input of the second microphone 202 but also the transmission path from an output of the second microphone 202 to the active noise cancellation integrated circuit 20. However, in order to simplify the analysis, the transfer function can be used to represent the transmission path from the active noise cancellation integrated circuit 20 to the input of the second microphone 202, wherein the transfer function is here served as a physical channel 205. It should be noted that the physical channel 205 includes the aforementioned speaker. In brief, the anti-noise electrical signal output by the active noise cancellation integrated circuit 20 is converted into an anti-noise audio signal in audio form through the aforementioned physical channel 205.

In addition, an another transmission path where the external noise signal enters the inner side of the headphone shell 19 from the outer side of the headphone shell 19 to a final arrival of the second microphone 202 is the primary path (not shown). For analysis, the primary path is presented as a transfer function. In brief, the external noise signal is converted into a residual noise signal by the transfer function of the primary path. Accordingly, to evaluate the transfer function of the primary path, it is necessary to involve the external noise signal and the residual noise signal into analysis.

However, in practice, the external noise signal and the residual noise signal cannot be directly obtained. A possible alternative is to receive the external noise signal through the first microphone 201 and to convert the external noise signal into another electrical signal in analog form. The another electrical signal in analog form is converted to an electrical signal in digital form, for example, sequentially through a preamplifier, an anti-aliasing filter and an analog-to-digital converter, wherein the said electrical signal in digital form is used to replace the external noise signal to evaluate the transfer function of the primary path. On the other hand, the residual noise signal is received through the second microphone 202 under a circumstance that the active noise cancellation integrated circuit 20 is disabled, and the residual noise signal is converted into the other electrical signal in an analog form. The other electrical signal in an analog form is converted to another electrical signal in digital form, for example, sequentially through a preamplifier, an anti-aliasing filter and an analog-to-digital converter, wherein the said another electrical signal in digital form is used to replace the residual noise signal to evaluate the transfer function of the primary path.

During actual operation of the active noise cancellation headphone (that is, when the active noise cancellation integrated circuit 20 is enabled), the anti-noise signal interferes with the residual noise signal to achieve the effect of active noise cancellation.

The active noise cancellation integrated circuit 20 includes a first path and a second path.

The first path receives an output signal from the first microphone 201, and outputs a first path anti-noise signal to the physical channel 205. The first path anti-noise signal is converted to a first signal for noise cancellation by the physical channel 205.

The second path receives an output signal from the second microphone 202, and outputs a second path anti-noise signal to the physical channel 205. The second path anti-noise signal is converted to a second signal for noise cancellation by the physical channel 205.

The first path includes a first ANC filtering unit 203. Further, the first path is from an output terminal of the first microphone 201, via the first ANC filtering unit 203, to an input terminal of the physical channel 205.

The second path includes a second ANC filtering unit 204. Further, the second path is from an output terminal of the second microphone 202, and via the second ANC filtering unit 204, to an input terminal of the physical channel 205.

In the embodiment of FIG. 2, the first ANC filtering unit 203 performs filtering process on an electrical signal output by the first microphone 201 to generate a first anti-noise signal $y'_1(n)$. The first anti-noise signal $y'_1(n)$ is served as the first path anti-noise signal in this embodiment. A weighting of the first ANC filtering unit 203 is labeled as $W_1$ in FIG. 2. The first ANC filtering unit 203 can be implemented by a variety of means, such as general purpose hardware (e.g., a microcontroller, a digital signal processor, a single-core processor, a multi-core processor with capability of parallel processing, a graphic processor, or other processor with the computational capability), to provide active noise cancellation filtering operation when software and/or firmware instructions are performed.

The second ANC filtering unit 204 performs filtering process on the output electrical signal of the second microphone 202 to generate a second anti-noise signal $y'_2(n)$. The second anti-noise signal $y'_2(n)$ in this embodiment is served as the second path anti-noise signal. A weighting of the second ANC filtering unit 204 is labeled as $W_2$ in FIG. 2. The second ANC filtering unit 204 can be implemented by a variety of means, such as general purpose hardware (e.g., a microcontroller, a digital signal processor, a single-core processor, a multi-core processor with capability of parallel processing, a graphic processor, or other processor with the computational capability), to provide active noise cancellation filtering operation when software and/or firmware instructions are performed.

In this embodiment, the first anti-noise signal $y'_1(n)$ and the second anti-noise signal $y'_2(n)$ are individually input to the physical channel 205. However, the present invention is not limited thereto. In some embodiment, the first anti-noise signal $y'_1(n)$ and the second anti-noise signal $y'_2(n)$ may be added together in digital domain, then the added anti-noise signal is input to the physical channel 205.

In the audio-to-electrical signal conversion device 21, the first anti-noise signal $y'_1(n)$ and the second anti-noise signal $y'_2(n)$ are converted to an audio signal through the physical channel 205 to synthesize a noise cancellation signal, that is, the aforementioned anti-noise signal. Due to the reflection and attenuation of sound waves in the ear canal, echo interference occurs when the noise cancellation signal is actually conducted in the ear canal. In other words, the noise cancellation signal would reach user's ear and the second microphone 202 through a real environment physical channel.

Figure 3:
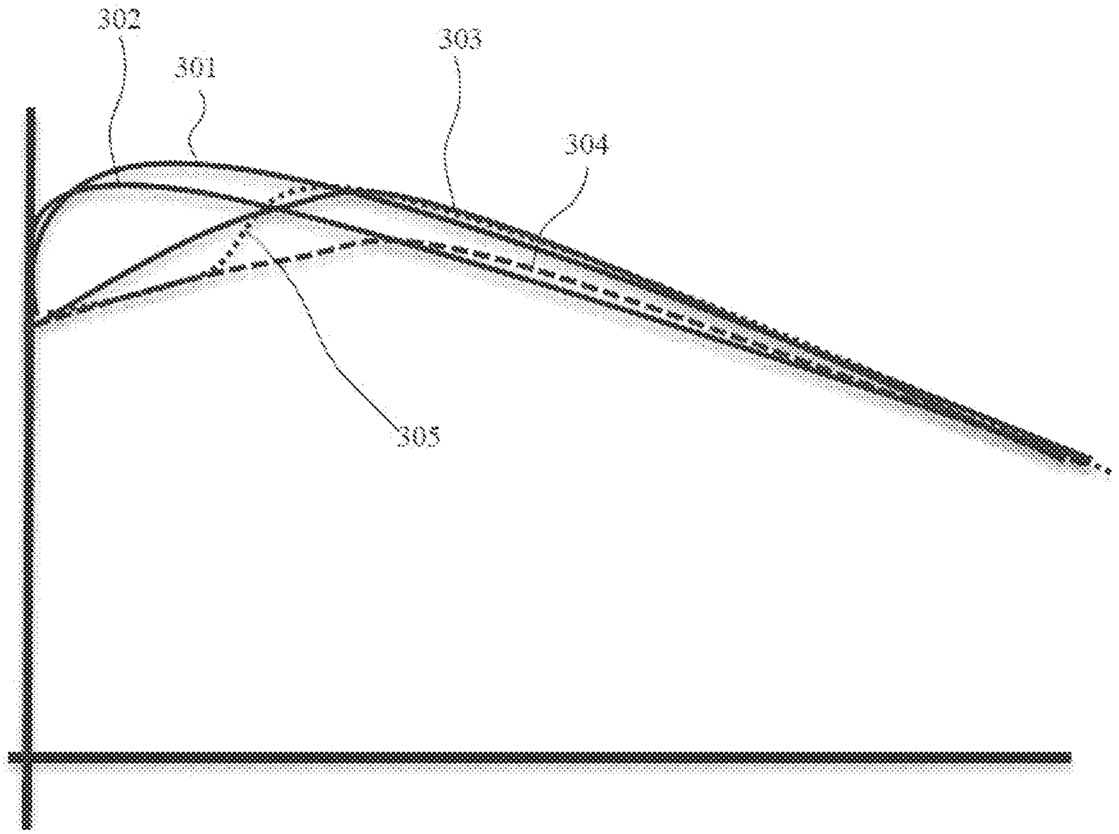
FIG. 3 illustrates a diagram depicting comparison of results of noise cancellation in FIG. 2.

In this embodiment, the active noise cancellation integrated circuit 20 for stacking multiple anti-noise signals is, for example, a dual anti-noise system with two active noise cancellation filter units 203 and 204 that can output two noise cancellation signals correspondingly. In general, the two noise cancellation signals are expected to interfere with each other, thereby reaching the effect of suppressing noise. However, the above expectation is unlikely to happen in reality, and the detailed descriptions are as follow in FIG. 3. Referring to FIG. 3, FIG. 3 is a schematic diagram depicting comparison of noise cancellation results of FIG. 2 of this embodiment.

As shown in FIG. 3, a vertical axis represents a magnitude of amplitude and a horizontal axis represents frequency. The label 301 represents a noise signal; the label 302 represents the noise suppression result when only the first ANC filtering unit 203 (i.e. feedforward filter, FF) is enabled; the label 303 represents the noise suppression result when only the second ANC filtering unit 204 (i.e. feedback filter, FB) is enabled; the label 304 represents the expected noise suppression result when the first ANC filtering unit 203 and the second ANC filtering unit 204 (FF+FB) are both enabled; and the label 305 represents the real noise suppression result when the first ANC filtering unit 203 and the second ANC filtering unit 204 (FF+FB) are both enabled. Comparing labels 304 and 305, it can be observed that labels 304 and 305 overlap in relatively lower band, but not at relatively high frequencies. That is to say, in relatively high band, the actual noise suppression result cannot reach the expected noise suppression result.

The reason why the unexpected noise suppression result occurs will be explain, please return to FIG. 2. The symbol d(n) represents a primary noise signal originating from the external noise signal, that is, the aforementioned residual noise signal; the symbol $y_1(n)$ represents the first signal related to the first anti-noise signal $y'_1(n)$ output by the first ANC filtering unit 203, the first signal $y_1(n)$ is the audio signal; the symbol $y_2(n)$ represents the second signal related to the second anti-noise signal $y'_2(n)$ output by the second ANC filtering unit 204, and the second signal $y_2(n)$ is the audio signal; and the symbol e(n) represents an error signal output by the second microphone 202. It should be noted that, in order to simplify the description, the process of converting the audio signal into an electrical signal in digital form is omitted.

The error signal e(n) output by the second microphone 202 can be regarded as an electrical signal in digital form.

When none of the active noise cancellation filtering units 203 and 204 is turned on, the second microphone 202 would only capture the primary noise signal d(n) as the error signal e(n), that is, e(n)=d(n). When the second ANC filtering unit 204 is turned on, the second microphone 202 would capture the primary noise signal d(n) and the second signal $y_2(n)$ to serve as the error signal e(n), that is, $e(n)=d(n)+y_2(n)$. The primary noise signal d(n) and the second signal $y_2(n)$ are added by an adding unit 206. It should be noted that the adding unit 206 shown in the FIG. 2 is not a physical component, and is only used to facilitate interpretation and analysis. Similarly, when the active noise cancellation filtering units 203 and 204 are turned on, the second microphone 202 would capture the primary noise signal d(n), the first signal $y_1(n)$ and the second signal $y_2(n)$ to serve as the error signal e(n), that is, $e(n)=d(n)+y_1(n)+y_2(n)$.

The second ANC filtering unit 204 generates the second anti-noise signal $y'_2(n)$ based on the error signal e(n) received by the second microphone 202. However, in this circumstance, based on the formula $e(n)=d(n)+y_1(n)+y_2(n)$, the error signal e(n) captured by the second microphone 202 is interfered by the first signal $y_1(n)$, such that the second anti-noise signal $y'_2(n)$ generated by the second ANC filtering unit 204 is not effective, which causes issues such as excessively processing noise. In brief, due to all of audio received by the second microphone 202 including the first signal $y_1(n)$, actual noise wouldn't be properly suppressed or would be overcompensated.

The headphone type in the above embodiment is an in-ear headphone. That is to say, the headphone shell 19 is considered to effectively block the second signal $y_2(n)$ from propagating to the outside of the in-ear headphone, so that the first microphone 201 cannot receive the second signal $y_2(n)$.

If the headphone type is an open-type headphone, the headphone shell 19 would be considered that the second signal $y_2(n)$ cannot be effectively blocked from propagating to the outside of the headphone, and the first microphone 201 would receive the second signal $y_2(n)$. That would cause more serious mutual interference, and it would cause more severe noise even than the noise under only single noise cancellation being turned on in the system.

Figure 4:
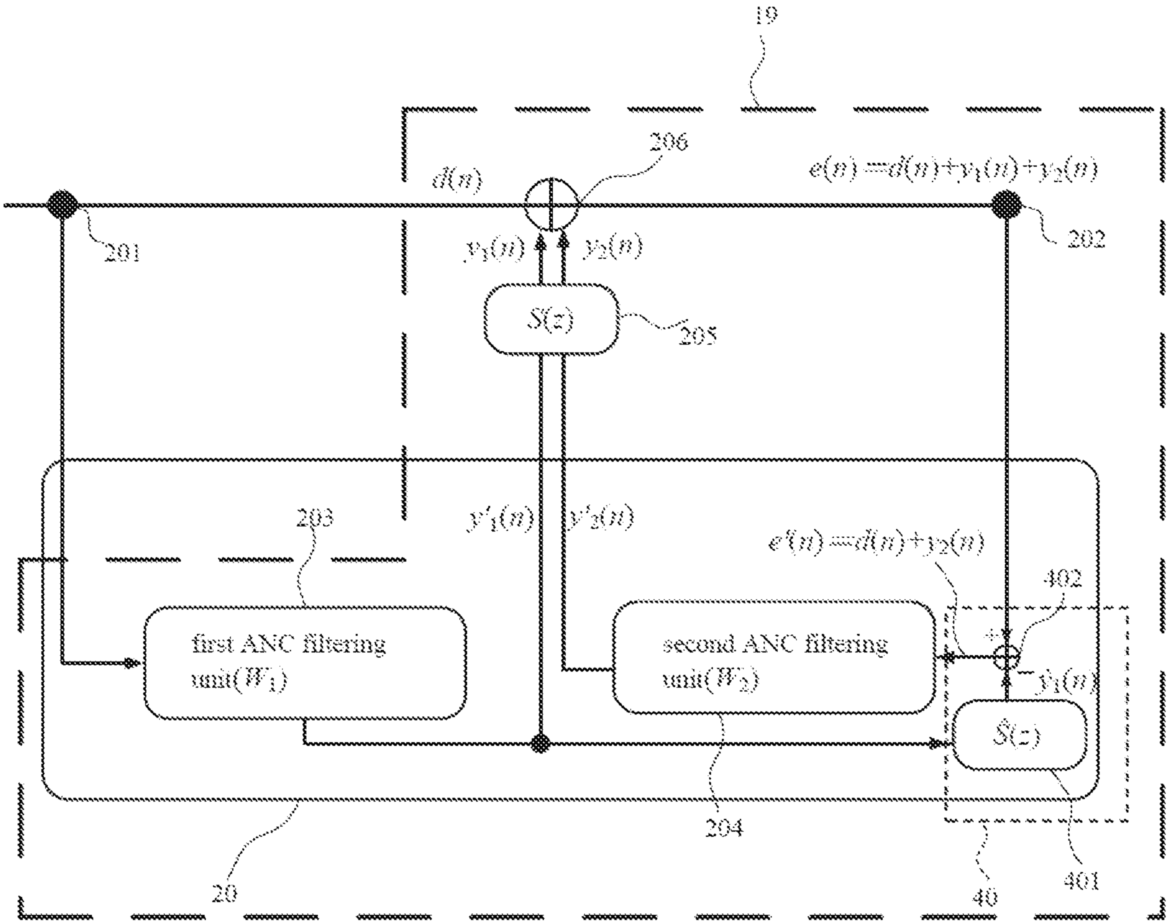
FIG. 4 illustrates a block diagram depicting an equivalent sampling time of an active noise cancellation headphone with good isolation between the ear canal and environment according to a preferred embodiment of the present invention.

In order to address the above issue, a possible way is to remove the component of the first signal $y_1(n)$ from the error signal e(n) based on the mathematical principle of linear system, as shown in the embodiment of FIG. 4.

FIG. 4 illustrates a block diagram depicting an equivalent sampling time of an active noise cancellation headphone with good isolation between an ear canal and environment according to a preferred embodiment of the present invention. The active noise cancellation headphone in FIG. 4 adopts hybrid noise cancellation architecture. Referring to FIG. 4, the active noise cancellation headphone in FIG. 4 is similar to the active noise cancellation headphone in FIG. 2, and the difference is that the active noise cancellation integrated circuit 20 for stacking multiple anti-noise signals in FIG. 4 further includes a first decoupling unit 40. The first decoupling unit 40 is used to remove the first signal $y_1(n)$ from the error signal e(n) captured by the second microphone 202 by electrical signal processing. In some embodiments, the first decoupling unit 40 may be implemented by a digital signal processor. In this embodiment, the first path is from an output terminal of the first microphone 201, via the first ANC filtering unit 203, to an input terminal of the physical channel 205; and the second path is from an output terminal of the second microphone 202, via the second ANC filtering unit 204, to an input terminal of physical channel 205.

The first decoupling unit 40 includes a first channel simulation filter 401 and a first adder circuit 402. The first channel simulation filter 401 simulates, for example, a transfer function of the physical channel 205. The simulated physical channel is represented as the Z-domain transfer function $\hat{S}(z)$. In other words, the simulated physical channel $\hat{S}(z)$ is substantially equivalent to the physical channel S(z) 205.

The physical channel 205 is used to represent transmission from an filter (e.g. the first ANC filtering unit 203 or the second ANC filtering unit 204) to the second microphone 202, in order to analyze the transformation of an electrical signal output by the ANC filter after the transmission, wherein the transfer function S(z) represents the simulation result. In some possible implementations, the external noise source is removed, and the transfer function S(z) is evaluated based on the electrical signal output by the ANC filter and the error signal e(n) acquired from the second microphone 202, wherein there is no primary noise signal d(n) since the external noise source is removed. Thus, the error signal is substantially equivalent to at least one of the first signal $y_1(n)$ and the second signal $y_2(n)$ or the sum of the first signal $y_1(n)$ and the second signal $y_2(n)$ according to the enablement state of the first ANC filtering unit 203 and the second ANC filtering unit 204.

The first channel simulation filter 401 receives the first anti-noise signal $y'_1(n)$ output by the first ANC filtering unit 203 to generate the first decoupling signal $\hat{y}_1(n)$. In this case where the simulated physical channel $\hat{S}(z)$ is substantially the same as the physical channel S(z) 205, since an input signal of the simulated physical channel $\hat{S}(z)$ and an input signal of the physical channel S(z) 205 are both first anti-noise signal $y'_1(n)$, the first decoupling signal $\hat{y}_1(n)$ output by the simulated physical channel $\hat{S}(z)$ is substantially equivalent to the first signal $y_1(n)$ output by the physical channel S(z) 205. Next, a first input port of the first adder circuit 402 receives the first decoupling signal $\hat{y}_1(n)$, and a second input port of the first adder circuit 402 receives the error signal e(n). Then, the first adder circuit 402 deducts the component of the first decoupling signal $\hat{y}_1(n)$ from the error signal e(n), which can be deemed as deducting the first signal $y_1(n)$ from the error signal e(n), and provides the deducted result to the second ANC filtering unit 204. The error signal e(n) received by the second ANC filtering unit 204 is substantially equal to $d(n)+y_2(n)$ and no longer contains the first signal $y_1(n)$. Therefore, the noise suppression effect would be significantly improved. In this embodiment, the first decoupling unit 40 deducts the first signal $y_1(n)$ from the error signal e(n) by electrical signal process, so as to solve the above-mentioned issue of overcompensation.

Figure 5:
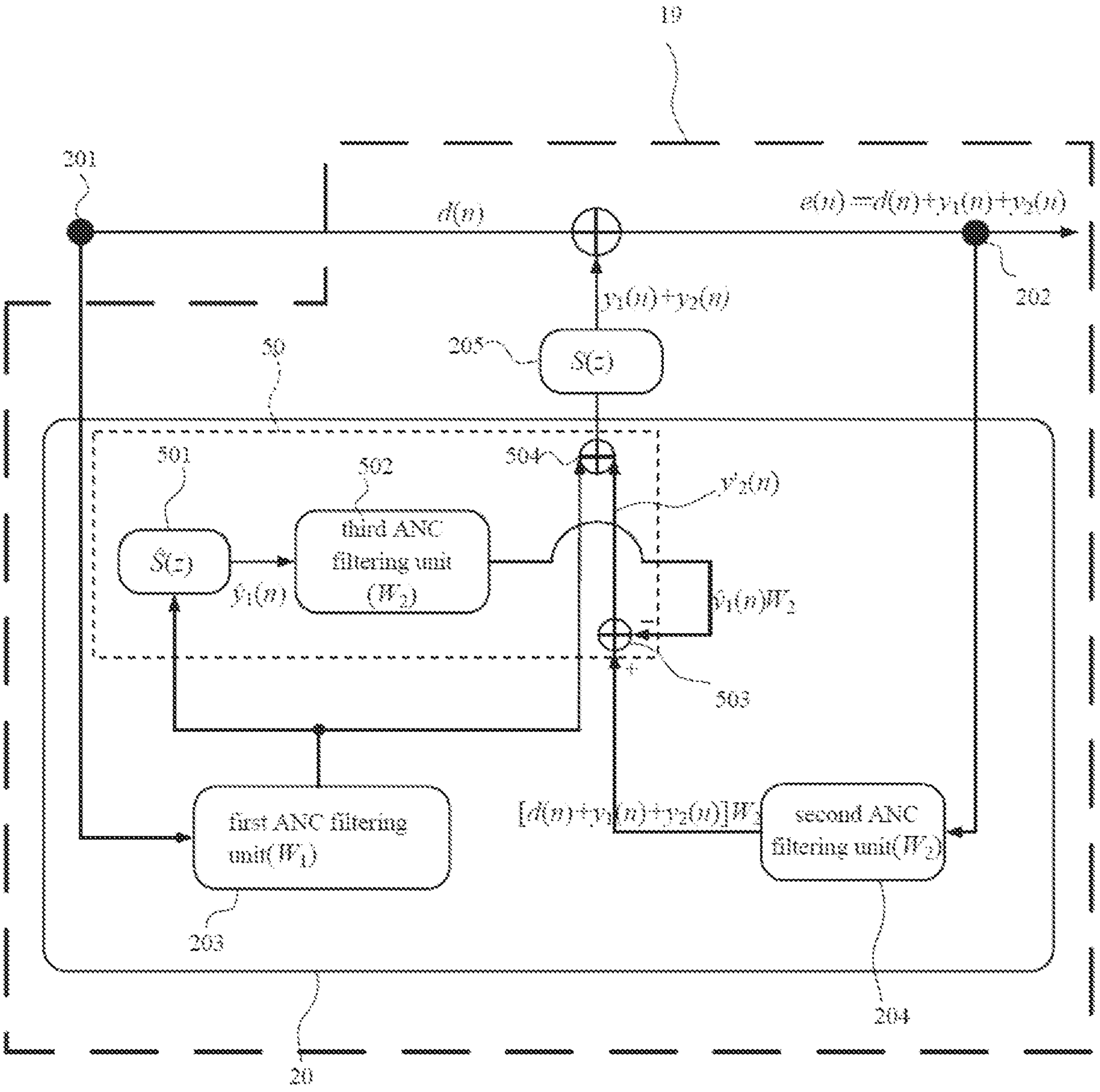
FIG. 5 illustrates a block diagram depicting an equivalent sampling time of an active noise cancellation headphone with good isolation between the ear canal and environment according to a preferred embodiment of the present invention.

FIG. 5 illustrates a block diagram depicting an equivalent sampling time of an active noise cancellation headphone with good isolation between an ear canal and environment according to a preferred embodiment of the present invention. In FIG. 5, the active noise cancellation headphone adopts hybrid active noise cancellation architecture. Referring to FIG. 2 and FIG. 5, in this embodiment, a first decoupling unit 50 is also extra added to the active noise cancellation integrated circuit 20 for stacking multiple anti-noise signals to remove the first signal $y_1(n)$ by electrical signal process.

In this embodiment, the first decoupling unit 50 includes a first channel simulation filter 501, a third ANC filtering unit 502, a first adder circuit 503 and a second adder circuit 504.

Function of the first channel simulation filter 501 is the same as that of the first channel simulation filter 401 in the embodiment of FIG. 4. The first channel simulation filter 501 is used to simulate the physical channel 205, and receive the first anti-noise signal $y'_1(n)$ to generate the first decoupling signal $\hat{y}_1(n)$, wherein the first anti-noise signal $y'_1(n)$ is obtained in a manner in which the external noise signal is received by the first microphone 201, in turn applied with sampling and analog-to-digital conversion, and further in turn processed by the first ANC filtering unit 203.

In this embodiment, the transfer function of the third ANC filtering unit 502 is, for example, the same as the transfer function of the second ANC filtering unit 204. Therefore, the weighting of the third ANC filtering unit 502 is also $W_2$. That is to say, the filtering operation of the third ANC filtering unit 502 is the same as that of the second ANC filtering unit 204. Thus, when the first decoupling signal $\hat{y}_1(n)$ is input to the third ANC filtering unit 502, the third anti-noise signal output by the third ANC filtering unit 502 can be represented as $\hat{y}_1(n)\ W_2$.

The second ANC filtering unit 204 receives the error signal output by the second microphone 202, which is marked as $d(n)+y_1(n)+y_2(n)$, so the signal output by the second ANC filtering unit 204 is marked as $[d(n)+y_1(n)+y_2(n)]W_2$.

A first input port of the first adder circuit 503 receives the third anti-noise signal $\hat{y}_1(n)\ W_2$, and a second input port of the first adder circuit 503 receives the second anti-noise signal $[d(n)+y_1(n)+y_2(n)]W_2$. Since $\hat{y}_1(n)$ is substantially equivalent to $y_1(n)$, after one of the two signals is subtracted from the other of the two signals by the first adder circuit 503, an output of the first adder circuit 503 is approximately equal to $[d(n)+y_2(n)]\ W_2$. Further, the primary noise signal d(n) in the output $[d(n)+y_2(n)]\ W_2$ is negligible. Therefore, the output $[d(n)+y_2(n)]\ W_2$ can be further simplified to the formula $[y_2(n)]\ W_2$, which is represented here as $y'_2(n)$. It can be seen that although the second ANC filtering unit 204 is interfered by the first signal $y_1(n)$, the interference is equivalently eliminated by the third ANC filtering unit 502 and the first adder circuit 503.

A first input port of the second adder circuit 504 is coupled to an output port of the first adder circuit 503 to receive the output $y'_2(n)$, and a second input port of the second adder circuit 504 receives the first anti-noise signal $y'_1(n)$. One of the two signals is added the other of the two signals to obtain $y'_1(n)+y'_2(n)$, which is served as the component of the electrical signal of the noise cancellation signal. In another preferred embodiment, the second adder circuit 504 may be omitted.

The abovementioned embodiment in FIG. 5 adopts a different decoupling method from that in FIG. 4, but it can also eliminate the component of the redundant first signal $y_1(n)$. Another embodiment is proposed below, which can also eliminate the component of the redundant first signal $y_1(n)$, such that people having ordinary skill in the art can implement the present invention accordingly.

Figure 6:
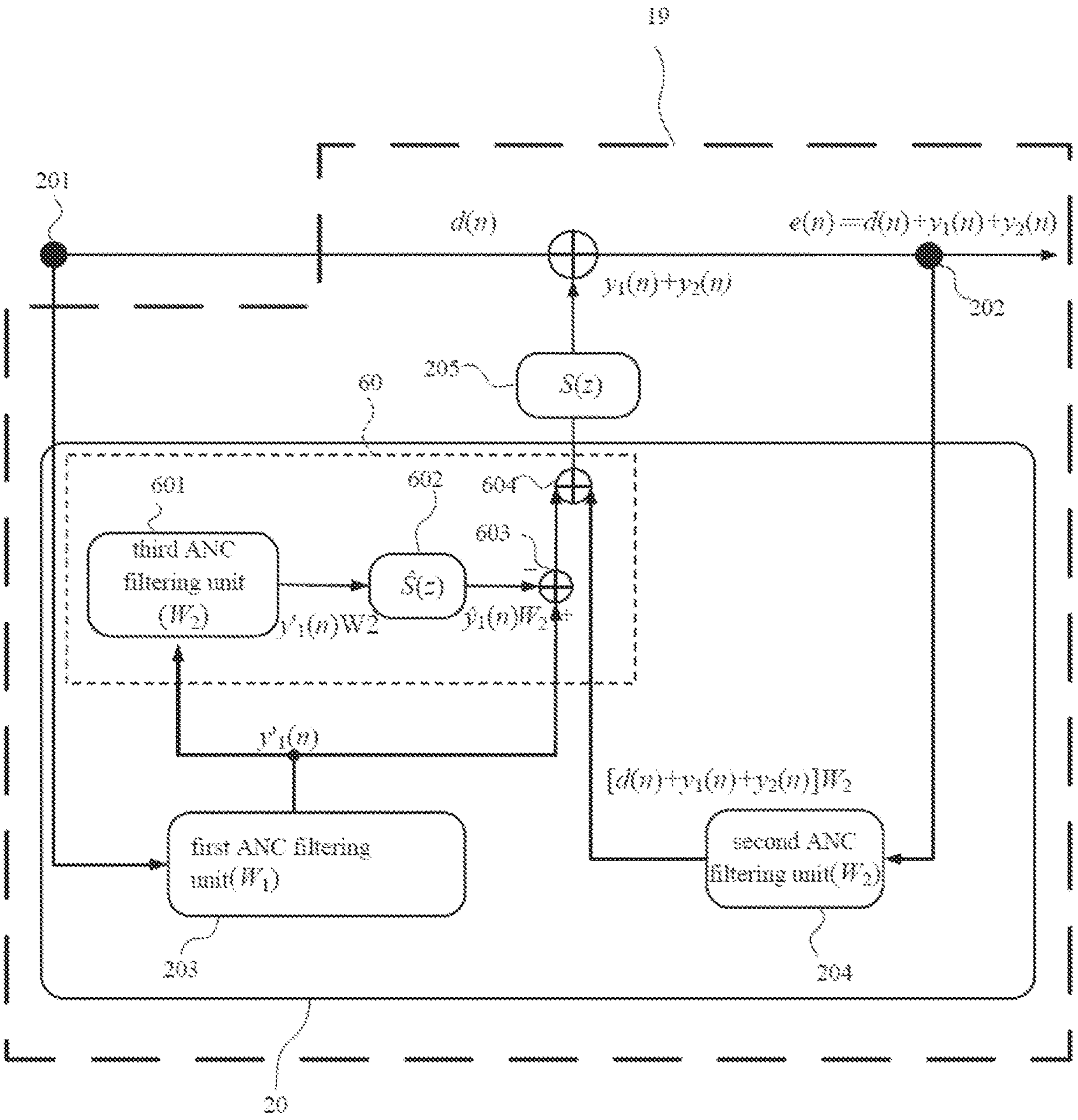
FIG. 6 illustrates a block diagram depicting an equivalent sampling time of an active noise cancellation headphone with good isolation between the ear canal and environment according to a preferred embodiment of the present invention.

FIG. 6 illustrates a block diagram depicting an equivalent sampling time of an active noise cancellation headphone with good isolation between an ear canal and environment according to a preferred embodiment of the present invention. In FIG. 6, the active noise cancellation headphone also adopts hybrid active noise cancellation architecture. Different from the embodiment in FIG. 5, the error signal e(n) provided by the second microphone 202 is processed to achieve the effect of decoupling. In the embodiment in FIG. 6, a signal provided by the first microphone 201 is processed to achieve the effect of decoupling. The detail description is as follows.

The first decoupling unit 60 includes a third ANC filtering unit 601, a channel simulation filter 602, a first adder circuit 603 and a second adder circuit 604, wherein the function of the channel simulation filter 602 is the same as the function of the first channel simulation filter 401 in the embodiment of FIG. 4.

The operation of the third ANC filtering unit 601 is the same as the operation of the second ANC filtering unit 204. The difference is that the third ANC filtering unit 601 receives the first anti-noise signal $y'_1(n)$ output by the first ANC filtering unit 203, and outputs the third anti-noise signal $y'_1(n)\ W_2$. Afterward, the third anti-noise signal $y'_1(n)\ W_2$ is processed by the first channel simulation filter 602 to generate the first decoupling signal $\hat{y}_1(n)\ W_2$.

Furthermore, the operation of the third ANC filtering unit 601 is similar to that of the third ANC filtering unit 502 in FIG. 5. The difference is that the first anti-noise signal $y'_1(n)$ in the embodiment of FIG. 5 is first processed by the first channel simulation filter 501 processed, and then processed by the third ANC filtering unit 502. In this embodiment, the first anti-noise signal $y'_1(n)$ is first processed by the third ANC filtering unit 601 and then processed by the channel simulation filter 602. According to the mathematical principle of the linear system, the abovementioned difference in the configuration sequence does not substantially lead to the change of the result. The detail description is omitted. Accordingly, in some embodiments, the first anti-noise signal $y'_1(n)$ can be configured to be processed by the channel simulation filter 602 first, and then in turn processed by the third ANC filtering unit 601.

A first input port of the first adder circuit 603 receives the first decoupling signal $\hat{y}_1(n)W_2$, a second input port of the first adder circuit 603 receives the first anti-noise signal $y'_1(n)$, and one of the two signals is subtracted from the other of the two signals. Then, the subtracted signal and a signal on the path of the second ANC filtering unit 204 are interfered with each other through the second adder circuit 604 to eliminate the component of the first signal $y_1(n)$ from the anti-noise signal $[d(n)+y_1(n)+y_2(n)]\ W_2$ output by the second ANC filtering unit 204. Specifically, the component $\hat{y}_1(n)W_2$ in the signal $[y'_1(n)-\hat{y}_1(n)W_2]$ output by the first adder circuit 603 is used to cancel the component $[y_1(n)W_2]$ in the anti-noise signal $[d(n)+y_1(n)+y_2(n)]W_2$ output by the second ANC filtering unit 204. Moreover, the primary noise signal d(n) in the anti-noise signal $[d(n)+y_1(n)+y_2(n)]\ W_2$ can be ignored. Accordingly, the signal output by the second adder circuit 604 is $[y_2(n)W_2+y'_1(n)]$, which can be further simplified as $[y'_2(n)+y'_1(n)]$.

In the abovementioned embodiments, in-ear headphone is taken as an example. Since the in-ear headphone has a good isolation effect between the internal microphone and the external microphone, the noise received by the internal microphone cannot be received by the external microphone. Therefore, in the abovementioned embodiments, echo noise cannot affect the first microphone 201. The following embodiment is an example without have good isolation.

Figure 7:
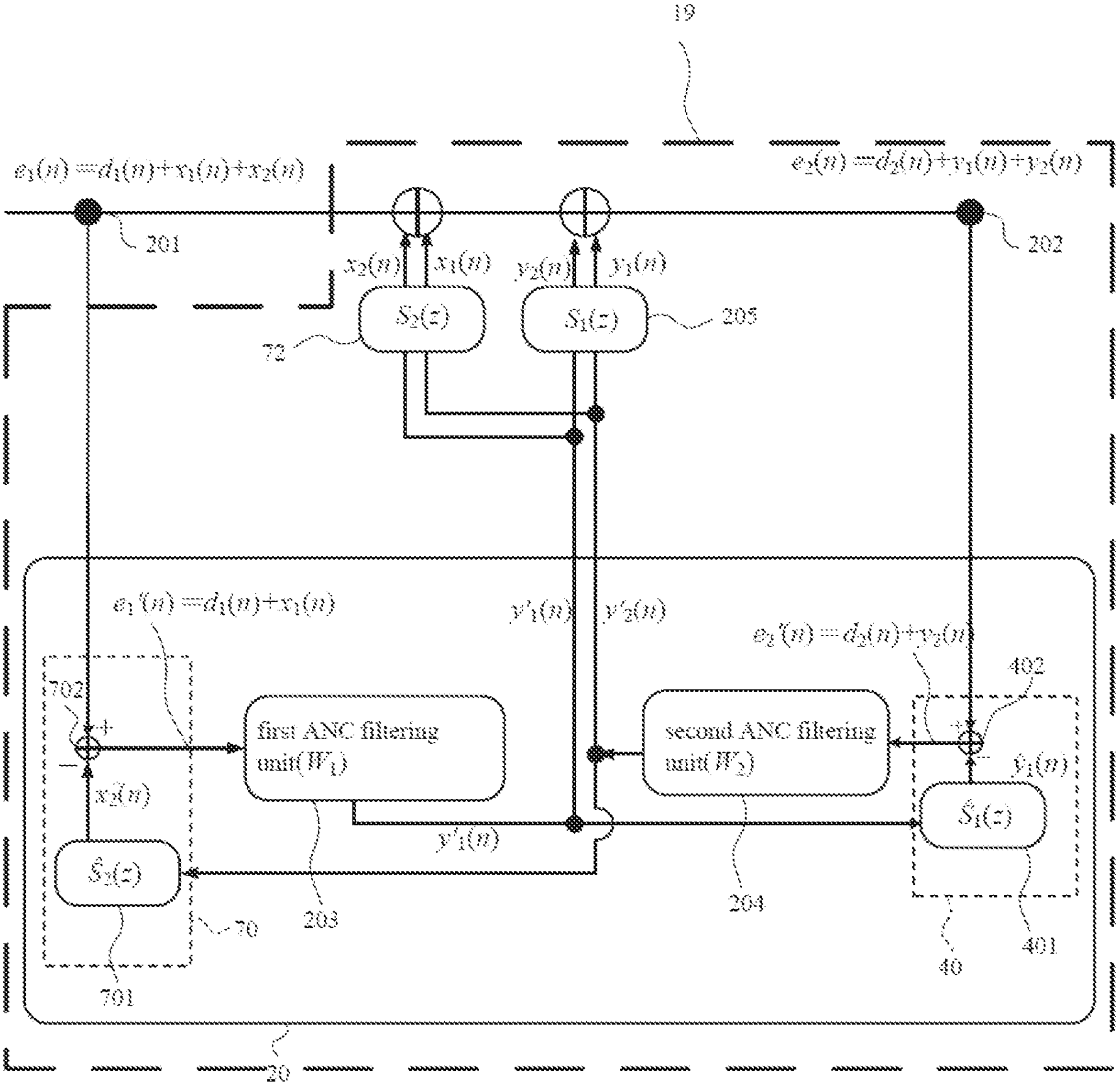
FIG. 7 illustrates a block diagram depicting an equivalent sampling time of an active noise cancellation headphone without good isolation between the ear canal and environment according to a preferred embodiment of the present invention.

FIG. 7 illustrates a block diagram depicting an equivalent sampling time of an active noise cancellation headphone without good isolation between an ear canal and environment according to a preferred embodiment of the present invention. In FIG. 7, the active noise cancellation headphone also adopts hybrid active noise cancellation architecture. Referring to FIG. 7, in this embodiment, the active noise cancellation headphone is semi-in-ear headphone. Since a headphone shell 19 of this type of active noise cancellation headphone cannot effectively block sound passing from the inside of the active noise cancellation headphone to the outside of the active noise cancellation headphone, the first microphone 201 disposed outside of the headphone would be interfered by the echo noise inside the ear canal. Therefore, in addition to the first decoupling unit 40, the active noise cancellation device of the above-mentioned active noise cancellation headphone system further includes a second decoupling unit 70.

This embodiment has the same concept as the abovementioned several embodiments. The first decoupling unit 40 is used for generating a first decoupling signal according to an anti-noise signal output by the first ANC filtering unit 203. Similarly, the second decoupling unit 70 is used for generating a second decoupling signal according to an anti-noise signal output by the second ANC filtering unit 204.

Similar to the embodiment in FIG. 4, in this embodiment, the first decoupling unit 40 includes a first channel simulation filter 401 and a first adder circuit 402. The first channel simulation filter 401, substantially equal to the physical channel 205, receives the first anti-noise signal $y'_1(n)$ output by the first ANC filtering unit 203 to generate the first decoupling signal $\hat{y}_1(n)$. The first decoupling signal $\hat{y}_1(n)$ is substantially equal to the first signal $y_1(n)$. The first error signal $e_2(n)$ received by the second microphone 202 is $[d_2(n)+y_1(n)+y_2(n)]$. Next, a first input port of the first adder circuit 402 receives the first decoupling signal $\hat{y}_1(n)$, and a second input port of the first adder circuit 402 receives the first error signal $e_2(n)$. Thereby, the first decoupling signal $\hat{y}_1(n)$ deducts the $y_1(n)$ component from the first error signal $e_2(n)$, and outputs the deducted first error signal $e_2(n)$ (hereinafter, a signal $e_2'(n)$) to the second ANC filtering unit 204. The signal $e_2'(n)$ received by the second ANC filtering unit 204 is substantially equal to $d_2(n)+y_2(n)$. In other words, the second ANC filtering unit 204 is no longer interfered by the first signal $y_1(n)$, and therefore can generate an effective anti-noise signal. In order to facilitate the description of the embodiment in FIG. 7, the transfer function of the physical channel 205 is represented as $S_1(z)$, and the transfer function of the first channel simulation filter 401 is represented as $\hat{S}_1(z)$.

On the other hand, since the mechanical appearance of the headphone is not an isolated type in this embodiment, the external first microphone 201 will also be interfered by the reverse of the echo noise inside the ear canal. Another physical channel 72 in this real environment is represented as $S_2(z)$ by the Z-domain transfer function. In other words, the transfer function $S_2(z)$ of the second physical channel 72 is used to represent the transmission between the active noise cancellation integrated circuit 20 and the input of the first microphone 201. Similarly, after the anti-noise signals $y'_1(n)$ and $y'_2(n)$ output by the active noise cancellation integrated circuit 20 are transmitted through the second physical channel 72, $x_1(n)$ represents an audio signal corresponding to the first anti-noise signal $y'_1(n)$, and $x_2(n)$ represents an audio signal corresponding to the second anti-noise signal $y'_2(n)$. Regarding the actual audio signal transmission, the signals $x_1(n)$ and $x_2(n)$ are transmitted from the ear canal to the first microphone 201, thus the channel response thereof is different from the channel response in the ear canal. Therefore, the signals $x_1(n)$ and $x_2(n)$ are different from the audio signals $y_1(n)$ and $y_2(n)$.

In addition to receiving the signals $x_1(n)$ and $x_2(n)$, the first microphone 201 also receives an external noise signal $d_1(n)$. Accordingly, the external noise signal $d_1(n)$, the signals $x_1(n)$ and $x_2(n)$ are converted to a second error signal $e_1(n)$ by the first microphone 201. In addition, the external noise signal $d_1(n)$ is converted into a primary noise signal $d_2(n)$ after entering from the outside of the active noise cancellation headphone to the inside of the active noise cancellation headphone. The primary noise signal $d_2(n)$ is substantially equal to the primary noise signal $d(n)$ in FIG. 2.

If the second error signal $e_1(n)$ is not appropriately processed, the second error signal $e_1(n)$ received by the first ANC filtering unit 203 includes the signal $x_2(n)$. Due to the similar reasoning provided in the embodiment of FIG. 2, the first ANC filtering unit 203 would be interfered by the signal $x_2(n)$ and the generated anti-noise signal thereof cannot effectively eliminate noise. Thus, the signal $x_2(n)$ needs to be removed from the second error signal $e_1(n)$, such that the signal received by the first ANC filtering unit 203 does not contain the signal $x_2(n)$.

Therefore, this embodiment provides a second decoupling unit 70 including a second channel simulation filter 701 and a second adder circuit 702. Since the signal $x_2(n)$ is output by the physical channel 72, the second channel simulation filter 701 needs to simulate the above physical channel 72 instead of simulating the physical channel 205 to effectively eliminate the signal $x_2(n)$ in the second error signal $e_1(n)$.

The second channel simulation filter 701 receives the second anti-noise signal $y'_2(n)$ output by the second ANC filtering unit 204 to generate the second decoupling signal $\hat{x}_2(n)$. The second decoupling signal $\hat{x}_2(n)$ is substantially equal to the signal $x_2(n)$. Next, a first input port of the second adder circuit 702 receives the second decoupling signal $\hat{x}_2(n)$, and a second input port of the second adder circuit 702 receives the second error signal $e_1(n)$. Thereby, the component of the signal $x_2(n)$ in the second error signal $e_1(n)$ is removed, and the removed second error signal $e_1(n)$ (hereinafter, a signal $e_1'(n)$) is output to the first ANC filtering unit 203. The signal $e_1'(n)$ received by the first ANC filtering unit 203 is substantially equal to $d_1(n)+x_1(n)$. The first ANC filtering unit 203 is not interfered by the signal $x_2(n)$, such that the generated first anti-noise signal $y'_1(n)$ thereof is effective.

In this embodiment, a first path is from an output terminal of the first microphone 201, via the first ANC filtering unit 203, to an input terminal of each of the physical channels 205 and 72. A second path is from an output terminal of the second microphone 202, via the second ANC filtering unit 204, to an input terminal of each of the physical channels 205 and 72. The first path anti-noise signal is converted to the third signal $x_1(n)$ by the second physical channel 72. The second path anti-noise signal is converted to the fourth signal $x_2(n)$ by the second physical channel 72. In other words, the first path receives the second error signal $e_1(n)$ with the component of the fourth signal $x_2(n)$, so that the first ANC filtering unit 203 in the first path is interfered by the fourth signal $x_2(n)$. The second decoupling unit 70 in this embodiment is used for removing the component of the fourth signal $x_2(n)$ from the first path based on the second anti-noise signal $y'_2(n)$.

Figure 8:
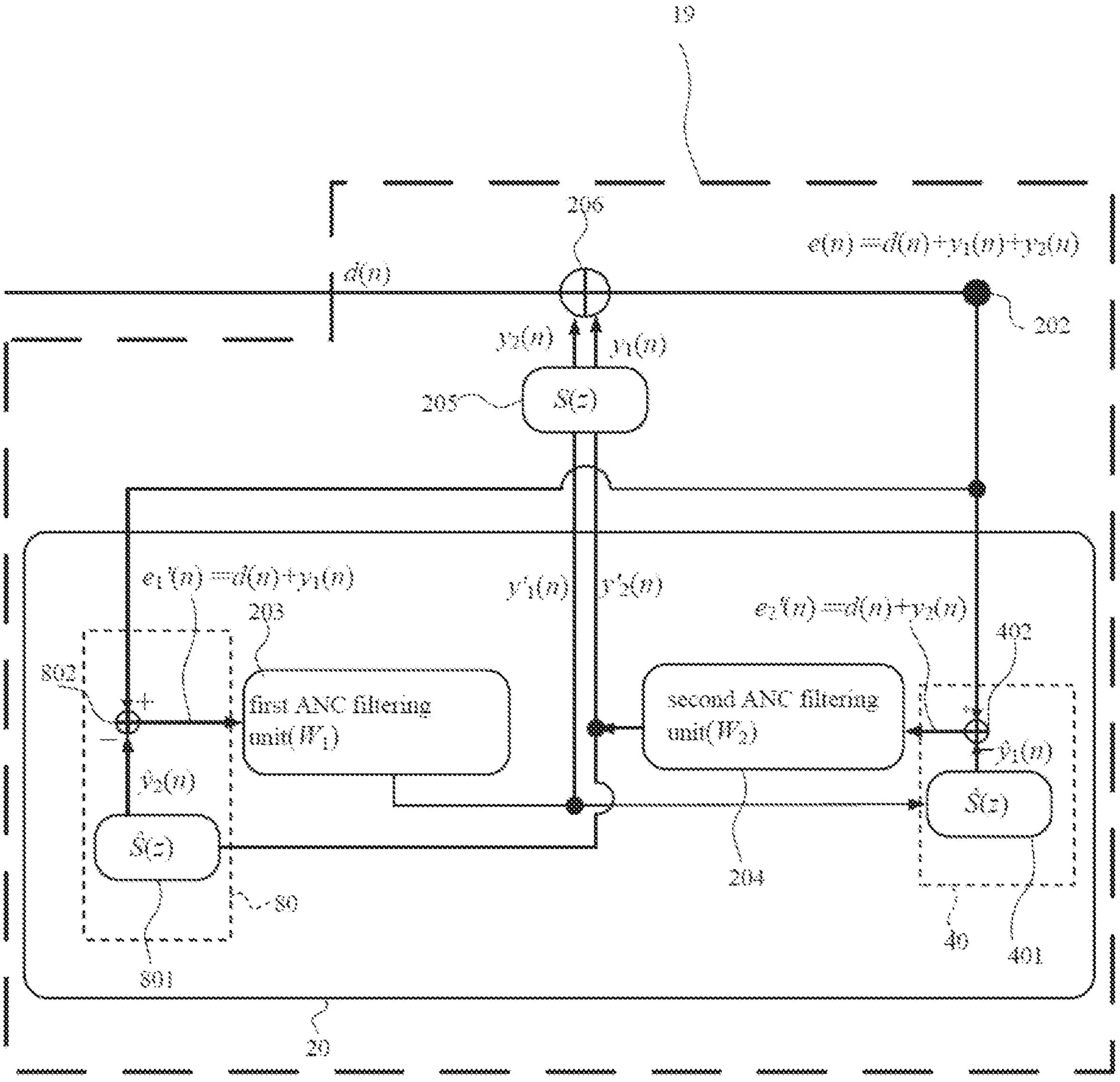
FIG. 8 illustrates a block diagram depicting an equivalent sampling time of an active noise cancellation headphone according to a preferred embodiment of the present invention.

In another embodiment, only a single microphone is implemented, but there are two active noise cancellation circuits in system. Referring to FIG. 8. FIG. 8 illustrates a block diagram depicting an equivalent sampling time of an active noise cancellation headphone according to a preferred embodiment of the present invention. In the embodiment of FIG. 8, the active noise cancellation headphone adopts feedback noise cancellation architecture. Referring to FIG. 8, in this embodiment, there is only the second microphone 202 (noise receiving microphone in an ear canal) in the active noise cancellation headphone. However, in this embodiment, there are the first ANC filtering unit 203 and the second ANC filtering unit 204.

Different from the embodiment in FIG. 7, if the signal to be received by the first ANC filtering unit 203 is not applied with a decoupling process, that is, the error signal $e(n)$ is without decoupling and is directly received by the first ANC filtering unit 203, the first ANC filtering unit 203 will be affected by the interference of the second signal $y_2(n)$ instead of the signal $x_2(n)$ of the embodiment of FIG. 7. Therefore, in order to effectively eliminate the signal $y_2(n)$ in the error signal $e(n)$, a channel simulation filter 801 in a second decoupling unit 80 needs to simulate the above physical channel 205 instead of the physical channel 72 to generate the second decoupling signal $\hat{y}_2(n)$. Similarly, the second adder circuit 802 receives the second decoupling signal $\hat{y}_2(n)$ and the error signal $e(n)$, subtracts the component of the signal $y_2(n)$ from the error signal $e(n)$ by subtracting the second decoupling signal $\hat{y}_2(n)$ from the error signal e(n), and outputs the result to the first ANC filtering unit 203. The signal $e_1'(n)$ received by the first ANC filtering unit 203 is substantially equal to $d(n)+y_1(n)$, so that the first ANC filtering unit 203 would not be interfered by the signal $y_2(n)$, thus the first anti-noise signal $y'_1(n)$ is generated to effectively cancel the noise.

That is to say, referring to FIG. 7 and FIG. 8. The embodiments of FIG. 7 and FIG. 8 adopt almost the same redundant elimination structure, and the only difference is that the embodiment in FIG. 8 only has the second microphone 202. Since the methods for eliminating redundant component(s) are similar, the detail description is omitted.

In this embodiment, a first path starts from an output terminal of the second microphone 202, and via the first ANC filtering unit 203, to an input terminal of the physical channel 205. A second path starts from an output terminal of the second microphone 202, via the second ANC filtering unit 204, to an input terminal of the physical channel 205.

Figure 9:
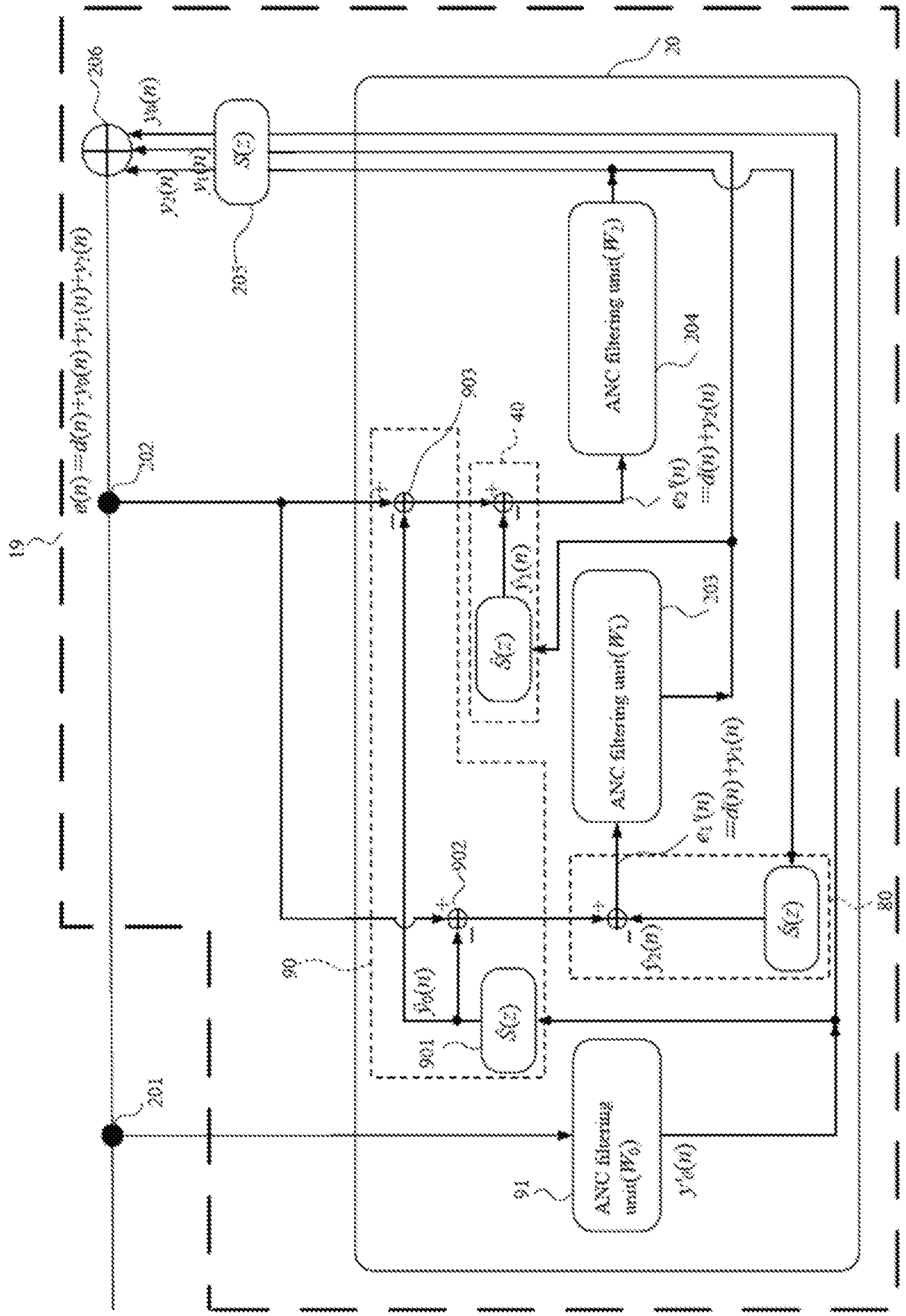
FIG. 9 illustrates a block diagram depicting an equivalent sampling time of an active noise cancellation headphone with good isolation between the ear canal and environment according to a preferred embodiment of the present invention.

FIG. 9 illustrates a block diagram depicting an equivalent sampling time of an active noise cancellation headphone with good isolation between an ear canal and environment according to a preferred embodiment of the present invention. In FIG. 9, the active noise cancellation headphone also adopts hybrid active noise cancellation architecture. Referring to FIG. 9 and FIG. 8, the difference between FIG. 9 and FIG. 8 is that feedforward noise cancellation is additionally added in FIG. 9, that is, the first microphone 201 and the third ANC filtering unit 91 are added.

For the first ANC filtering unit 203, if a signal to be received by the first ANC filtering unit 203 is not applied with a decoupling process, the first ANC filtering unit 203 would be interfered by the signals $y_0(n)$ and $y_2(n)$. Therefore, a channel simulation filter 901 and an adder circuit 902 in a third decoupling unit 90 are used to eliminate the interference of the signal $y_0(n)$, and a second decoupling unit 80 is used to eliminate the interference of the signal $y_2(n)$. The principle of eliminating interference is the same as that of the previous embodiments. Thus, the detail description is omitted.

For the second ANC filtering unit 204, if a signal to be received by the second ANC filtering unit 204 is not applied with a decoupling process, the second ANC filtering unit 204 would be interfered by the signals $y_0(n)$ and $y_1(n)$. Therefore, the channel simulation filter 901 and an adder circuit 903 in the third decoupling unit 90 are used to eliminate the interference of the signal $y_0(n)$, and the first decoupling unit 40 is used to eliminate the interference of the signal $y_1(n)$. The principle of eliminating interference is the same as that of the previous embodiments. Thus, the detail description is omitted. In addition, in this embodiment, in order to simplify wiring complexity in component schematic diagram, relative positions between the adding unit 206 and the second microphone 202 in FIG. 9 are reversed with that between the adding unit 206 and the second microphone 202 in FIG. 8. People having ordinary skill in the art should know that the relative position between the adding unit 206 and the second microphone 202 in drawings cannot be used to limit the configuration of the present invention.

According to the description above, this embodiment further includes a third path, starting from an output terminal of the first microphone 201, via the third ANC filtering unit 91, to an input terminal of the physical channel 205. A third anti-noise signal $y'_0(n)$ output by the third ANC filtering unit 91 is, for example, the third path anti-noise signal in this embodiment, and the third anti-noise signal $y'_0(n)$ is converted to a third signal $y_0(n)$ by the physical channel 205. Since both the first path and the second path receive the error signal e(n) containing the component of the third signal $y_0(n)$, the third decoupling unit 90 proposed in this embodiment removes the component of the third signal $y_0(n)$ from the first path and the second path based on the third anti-noise signal $y'_0(n)$.

Figure 10:
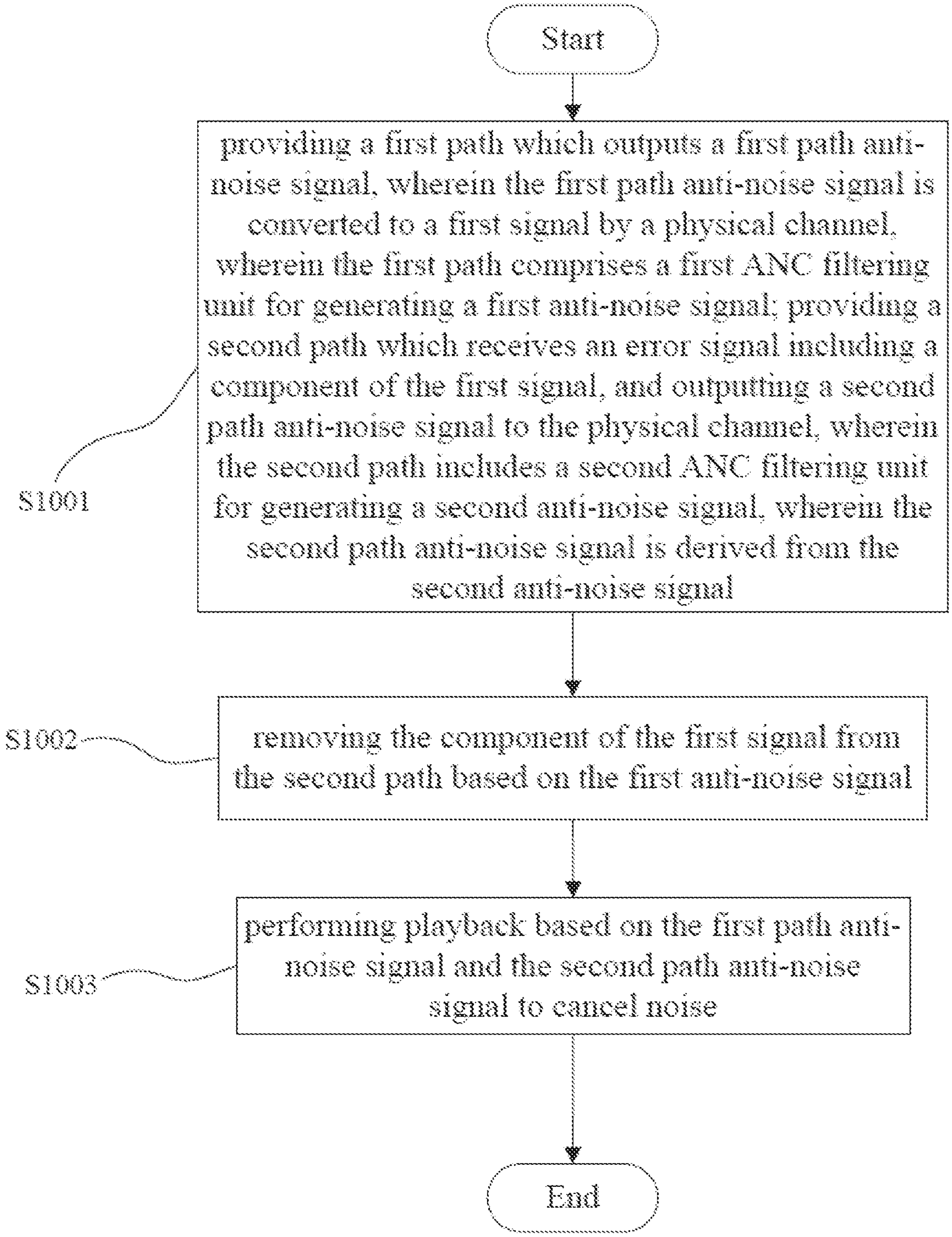
FIG. 10 illustrates a flowchart depicting an active noise cancellation method for stacking multiple anti-noise signals according to a preferred embodiment of the present invention.

In order to address the abovementioned issue, an embodiment of the present invention provides an active noise cancellation method for stacking multiple anti-noise signals. FIG. 10 illustrates a flowchart depicting an active noise cancellation method for stacking multiple anti-noise signals according to a preferred embodiment of the present invention. Referring to FIG. 10, the active noise cancellation method for stacking multiple anti-noise signals includes the steps as follow.

In step S1001, a first path is provided, and a first path anti-noise signal is output, wherein the first path anti-noise signal is converted to a first signal by a physical channel, wherein the first path includes a first ANC filtering unit for generating a first anti-noise signal. A second path is provided. The second path receives an error signal including a component of the first signal, and outputs a second path anti-noise signal to the physical channel, wherein the second path includes a second ANC filtering unit for generating a second anti-noise signal, and wherein the second path anti-noise signal is derived from the second anti-noise signal.

In step S1002, the component of the first signal is removed from the second path based on the first anti-noise signal. As shown in FIG. 4, at an input of the second ANC filtering unit 204, the first signal $y_1(n)$ is, based on the first anti-noise signal and by means of the first channel simulation filter 401, removed from the error signal e(n) to be received by the second ANC filtering unit 204. Furthermore, as shown in FIG. 5, based on the first anti-noise signal and by means of the first channel simulation filter 501 and the third ANC filtering unit 502, which has the same transfer function as the second ANC filtering unit, a decoupling signal is generated, and the decoupling process is applied at an output terminal of the second ANC filtering unit 204. Similarly, as shown in FIG. 6, based on the first anti-noise signal and by means of the sound channel analog filter 602 and the third ANC filtering unit 601, which has the same transfer function as the second ANC filtering unit, a decoupling signal is generated, and the decoupling process is applied at an output of the second ANC filtering unit 204. In other words, as long as there are at least two active noise cancellation filter units and anti-noise signals generated by the active noise cancellation filter units are coupled to each other, a decoupling signal can be generated by a specific one of the anti-noise signals, to eliminate the specific anti-noise signal component in a path of active noise cancellation filter units other than active noise cancellation filter units generating the specific anti-noise signal. Thereby, the present invention can eliminate the abovementioned mutual interference. The abovementioned embodiments in FIG. 7, FIG. 8, and FIG. 9 are derived from the spirit of the present invention. Therefore, the present invention is not limited to FIG. 4, FIG. 5, and FIG. 6.

In step S1003, a playback is performed based on the first path anti-noise signal and the second path anti-noise signal to cancel noise.

In summary, the spirit of the present invention is to set multiple active noise cancellation filtering unit in active noise cancellation apparatuses of active noise cancellation headphones. Moreover, the redundant component (s) generated from an output signal of active noise cancellation filtering units is/are canceled by a decoupling process. Thus, an output noise cancellation signal from the active noise cancellation apparatus would match the received noise relatively well such that the received noise can be properly canceled.

In above embodiments, a filter circuit located at the first path included in the active noise cancellation integrated circuit 20 is used for the ANC purpose. However, this is for illustrative purposes only, and is not meant to be a limitation of the present invention. In practice, any application using the proposed decoupling technique falls with the scope of the present invention.

For example, an active noise cancellation integrated circuit using the proposed decoupling technique may have an ANC function (e.g., a feedback ANC function) integrated with a hearing aid (HA) function. The principle of HA is to amplify the sound picked up by the reference microphone and then play back to a hearing-impaired user for hearing loss compensation. The characteristics of the amplification are controlled by an HA filter which is a non-ANC filter.

For another example, an active noise cancellation integrated circuit using the proposed decoupling technique may have an ANC function (e.g., a feedback ANC function) integrated with a pass-through (PT) function. PT is very similar to HA, and is to calibrate the sound picked up by the reference microphone and then play back to the user to recover the sound blocked or attenuated by the headphone/earphone shell. In some applications, the PT function can be used to boost audio components in a high-frequency band that is blocked or attenuated by the headphone/earphone shell. Hence, the user wearing a headphone/earphone that operates in a PT mode may hear the ambient sound very similar to that heard by the user without wearing the headphone/earphone. The compensation is controlled by a PT filter which is a non-ANC filter.

For yet another example, an active noise cancellation integrated circuit using the proposed decoupling technique may have an ANC function (e.g., a feedback ANC function) integrated with a personal sound amplification (PSAP) function. As the name suggests, PSAP is to amplify the sound but does not address other components of hearing loss. Specifically, PSAP has not been approved as a medical device by the Food and Drug Administration (FDA), and is classified as a wearable electronic product for occasional, recreation use by a user who is not hearing impaired. The characteristics of the amplification are controlled by a PSAP filter which is a non-ANC filter.

The ANC function (e.g., feedback ANC function) could cancel the low-frequency noise picked up by an in-ear microphone acting as an error microphone, and is helpful to reduce the occlusion effect caused by HA/PT/PSAP. However, the ANC function (e.g., feedback ANC function) will also cancel the sound played by the speaker of the headphone/earphone, which reduces the performance of HA/PT/PSAP. The proposed decoupling technique mentioned above can also be used to improve performance of HA/PT/PSAP provided by a non-ANC filter through mitigating or cancelling the side effect caused by an ANC filter (e.g., a feedback ANC filter).

Figure 11:
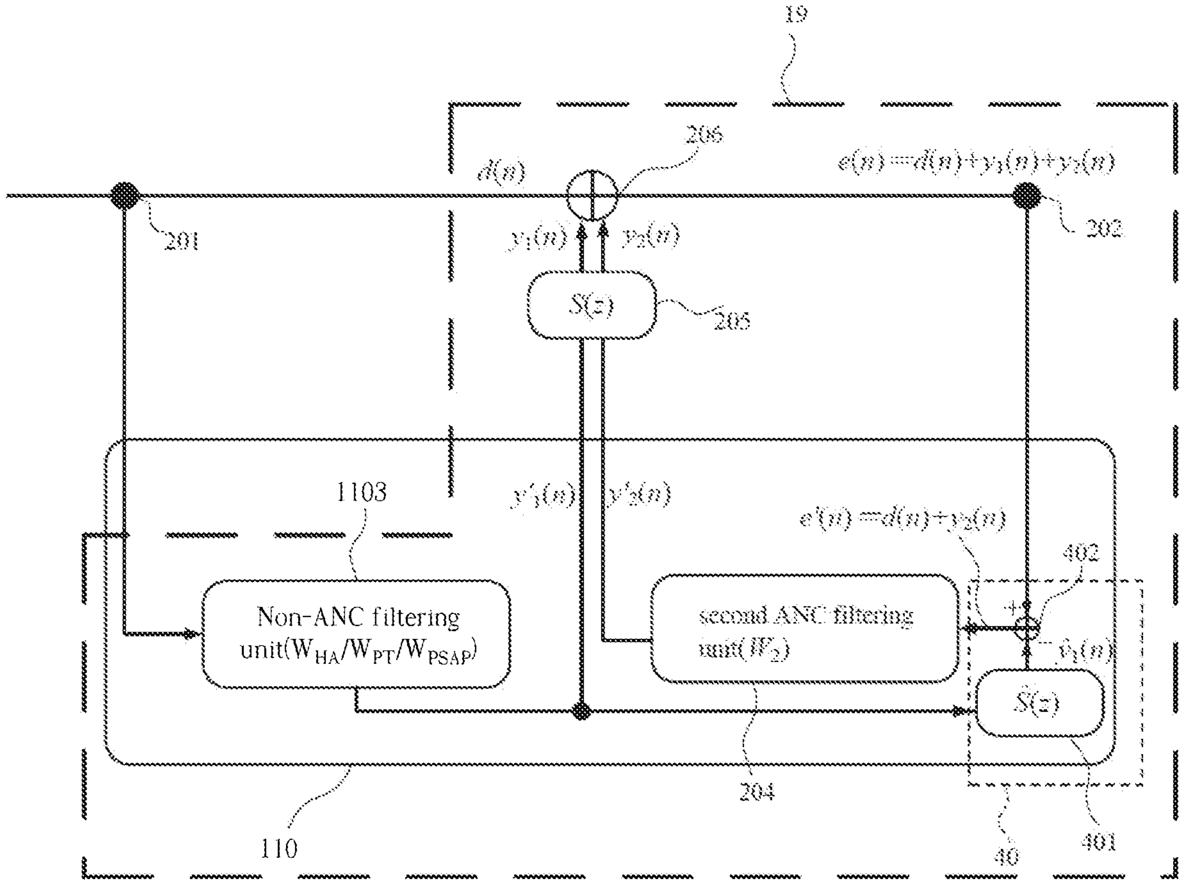
FIG. 11 illustrates a block diagram depicting an equivalent sampling time of an active noise cancellation headphone with good isolation between an ear canal and environment according to a preferred embodiment of the present invention.

FIG. 11 illustrates a block diagram depicting an equivalent sampling time of an active noise cancellation headphone with good isolation between an ear canal and environment according to a preferred embodiment of the present invention. The active noise cancellation headphone in FIG. 11 is similar to the active noise cancellation headphone in FIG. 4, and the difference is that the active noise cancellation integrated circuit 110 is used for stacking at least one anti-noise signal and at least one non-anti-noise signal, and includes a non-ANC filtering unit (e.g., a digital filter) 1103 that takes the place of the first ANC filtering unit 203 (e.g., a digital filter) shown in FIG. 4. Hence, the first decoupling unit 40 receives the non-anti-noise signal $y'_1(n)$ output from the non-ANC filtering unit 1103 rather than the first anti-noise signal $y'_1(n)$ output from the first ANC filtering unit 203, and removes the first signal $y_1(n)$ from the error signal e(n) captured by the second microphone 202 by electrical signal processing. In this embodiment, the first path is from an output terminal of the first microphone 201, via the non-ANC filtering unit 1103, to an input terminal of the physical channel 205; and the second path is from an output terminal of the second microphone 202, via the second ANC filtering unit 204, to an input terminal of physical channel 205. Since the first signal $y_1(n)$ (which is derived from passing the non-anti-noise signal $y'_1(n)$ through the physical channel 205) is removed from the second path through the first decoupling unit 40, the intended purpose of the non-ANC filtering unit 1103 can be achieved by mitigating or cancelling the side effect caused by the second ANC filtering unit 204. That is, the feedback ANC does not cause loss of the first signal $y_1(n)$, and the intended purpose of the non-ANC filtering unit 1103 can be achieved without performance degradation.

The present invention has no limitations on the non-ANC filtering unit 1103. The non-ANC filtering unit 1103 may be set by any suitable non-ANC filter needed by an application. For example, the non-ANC filtering unit 1103 may be an HA filter with a weighting labeled as $W_{HA}$. For another example, the non-ANC filtering unit 1103 may be a PT filter with a weighting labeled as $W_{PT}$. For yet another example, the non-ANC filtering unit 1103 may be a PSAP filter with a weighting labeled as $W_{PSAP}$.

The active noise cancellation integrated circuit 110 shown in FIG. 11 and the active noise cancellation integrated circuit 20 shown in FIG. 4 have the same circuit architecture except generation of the filter output $y'_1(n)$. As a person skilled in the art can readily understand the mathematical principle of the active noise cancellation integrated circuit 110 shown in FIG. 11 after reading above paragraphs directed to the active noise cancellation integrated circuit 20 shown in FIG. 4, further description is omitted here for brevity.

Figure 12:
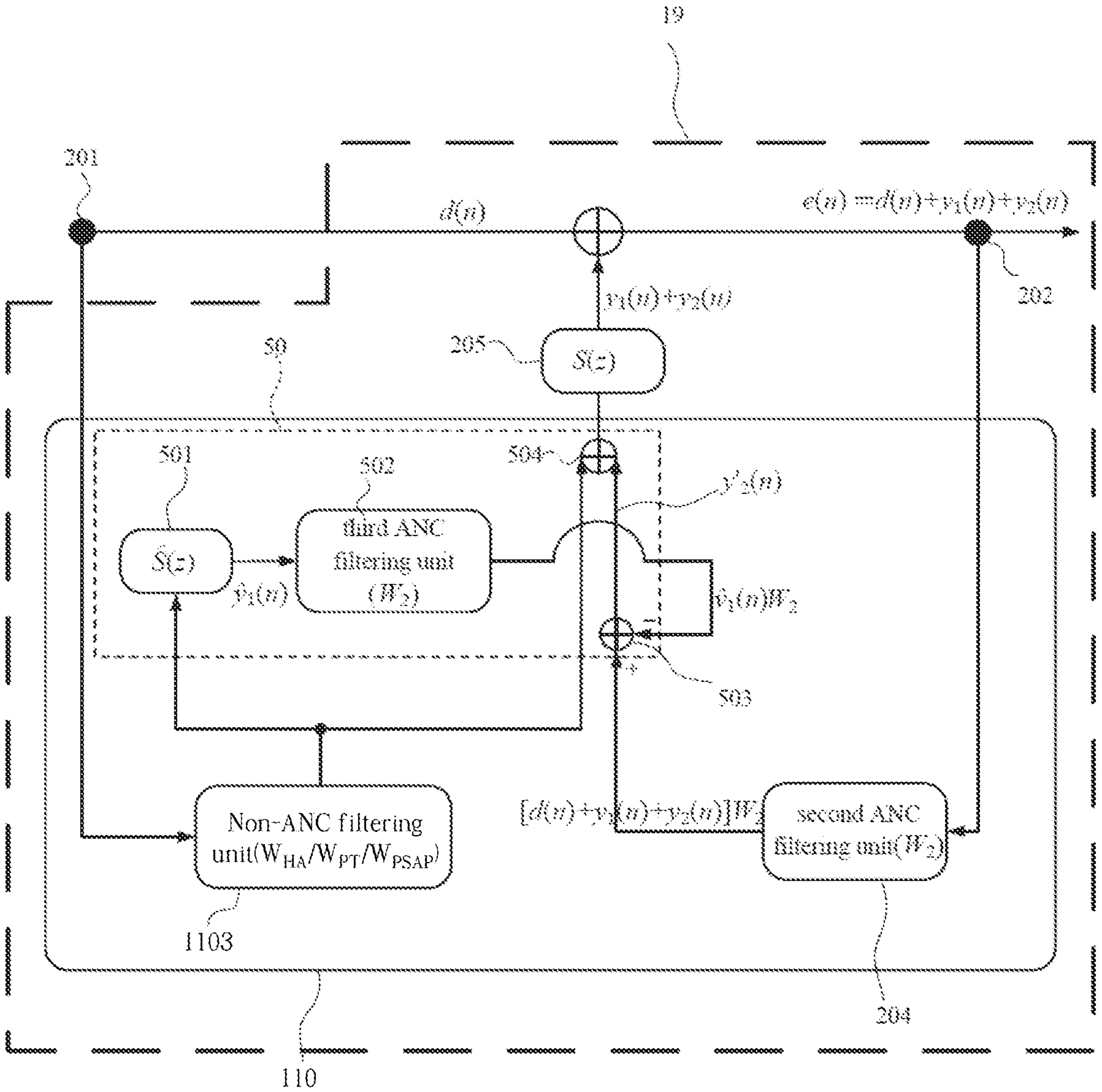
FIG. 12 illustrates a block diagram depicting an equivalent sampling time of an active noise cancellation headphone with good isolation between an ear canal and environment according to a preferred embodiment of the present invention.

FIG. 12 illustrates a block diagram depicting an equivalent sampling time of an active noise cancellation headphone with good isolation between an ear canal and environment according to a preferred embodiment of the present invention. The active noise cancellation headphone in FIG. 12 is similar to the active noise cancellation headphone in FIG. 5, and the difference is that the active noise cancellation integrated circuit 110 is used for stacking at least one anti-noise signal and at least one non-anti-noise signal, and includes the non-ANC filtering unit 1103 that takes the place of the first ANC filtering unit 203 shown in FIG. 5. Hence, in this embodiment, the first decoupling unit 50 receives the non-anti-noise signal $y'_1(n)$ output from the non-ANC filtering unit 1103 rather than the first anti-noise signal $y'_1(n)$ output from the first ANC filtering unit 203. Specifically, the first channel simulation filter 501 is used to simulate the physical channel 205, and receive the non-anti-noise signal $y'_1(n)$ to generate the first decoupling signal $y_1(n)$, wherein the non-anti-noise signal $y'_1(n)$ is obtained in a manner in which the external noise signal is received by the first microphone 201, in turn applied with sampling and analog-to-digital conversion, and further in turn processed by the non-ANC filtering unit 1103. Furthermore, the second input port of the second adder circuit 504 receives the non-anti-noise signal $y'_1(n)$ output from the non-ANC filtering unit

1103 rather than the first anti-noise signal $y'_1(n)$ output from the first ANC filtering unit 203.

It can be seen that although the second ANC filtering unit 204 is interfered by the first signal $y_1(n)$, the interference is equivalently eliminated by the third ANC filtering unit 502 and the first adder circuit 503. Since the first signal $y_1(n)$ (which is derived from passing the non-anti-noise signal $y'_1(n)$ through the physical channel 205) is removed from the second path through the first decoupling unit 50, the intended purpose of the non-ANC filtering unit 1103 can be achieved by mitigating or cancelling the side effect caused by the second ANC filtering unit 204. That is, the feedback ANC does not cause loss of the first signal $y_1(n)$, and the intended purpose of the non-ANC filtering unit 1103 can be achieved without performance degradation.

The present invention has no limitations on the non-ANC filtering unit 1103. The non-ANC filtering unit 1103 may be set by any suitable non-ANC filter needed by an application. For example, the non-ANC filtering unit 1103 may be an HA filter with a weighting labeled as $W_{HA}$. For another example, the non-ANC filtering unit 1103 may be a PT filter with a weighting labeled as $W_{PT}$. For yet another example, the non-ANC filtering unit 1103 may be a PSAP filter with a weighting labeled as $W_{PSAP}$.

According to the mathematical principle of the linear system, the difference in the configuration sequence does not substantially lead to the change of the result. For example, in some embodiments, the non-anti-noise signal $y'_1(n)$ output from the non-ANC filtering unit 1103 can be configured to be processed by the third ANC filtering unit 502 first, and then in turn processed by the first channel simulation filter 501.

The active noise cancellation integrated circuit 110 shown in FIG. 12 and the active noise cancellation integrated circuit 20 shown in FIG. 5 have the same circuit architecture except generation of the filter output $y'_1(n)$. As a person skilled in the art can readily understand the mathematical principle of the active noise cancellation integrated circuit 110 shown in FIG. 12 after reading above paragraphs directed to the active noise cancellation integrated circuit 20 shown in FIG. 5, further description is omitted here for brevity.

The abovementioned embodiment in FIG. 12 adopts a different decoupling method from that in FIG. 11, but it can also eliminate the component of the redundant first signal $y_1(n)$. Another embodiment is proposed below, which can also eliminate the component of the redundant first signal $y_1(n)$, such that people having ordinary skill in the art can implement the present invention accordingly.

Figure 13:
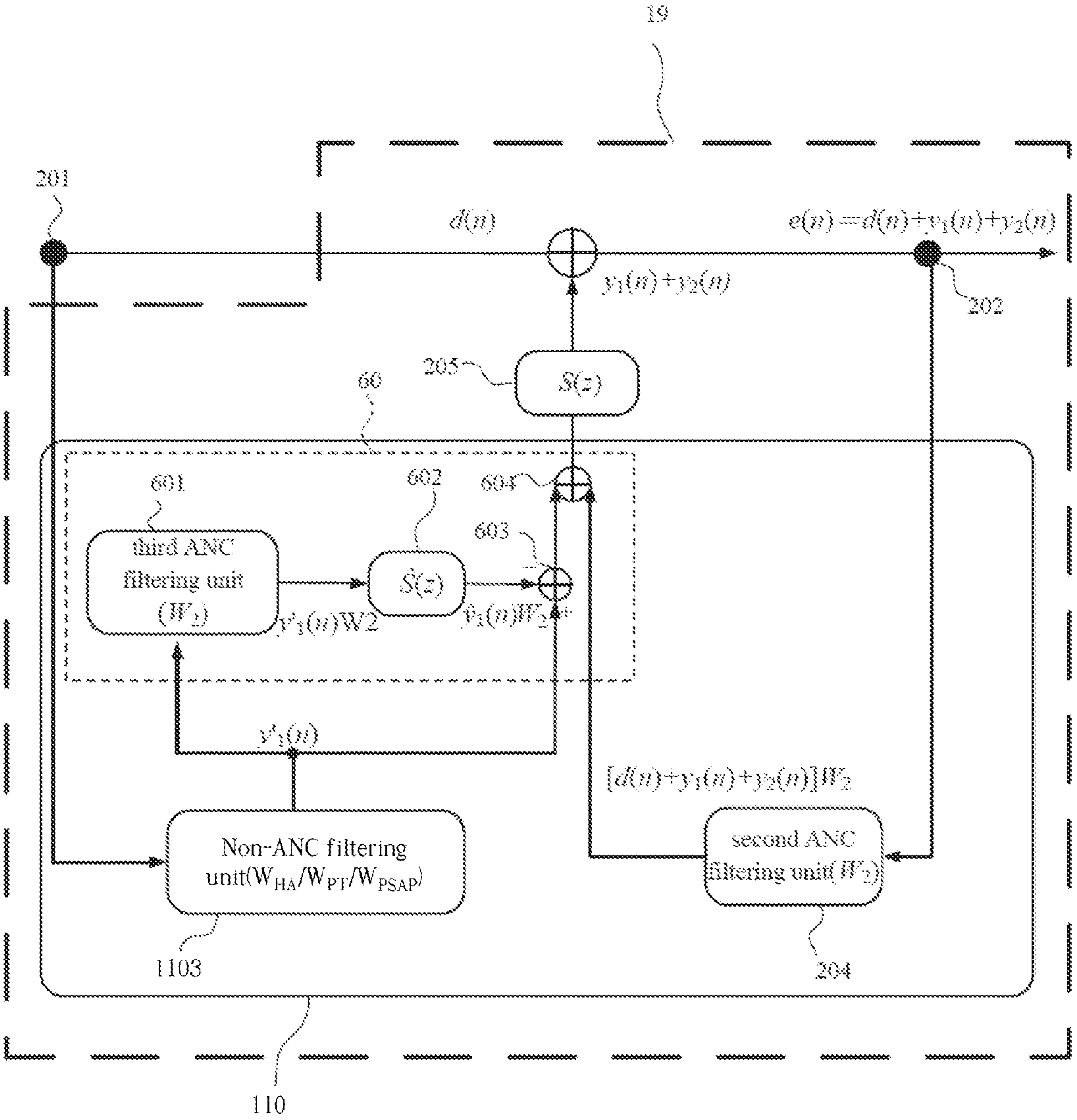
FIG. 13 illustrates a block diagram depicting an equivalent sampling time of an active noise cancellation headphone with good isolation between an ear canal and environment according to a preferred embodiment of the present invention.

FIG. 13 illustrates a block diagram depicting an equivalent sampling time of an active noise cancellation headphone with good isolation between an ear canal and environment according to a preferred embodiment of the present invention. The active noise cancellation headphone in FIG. 13 is similar to the active noise cancellation headphone in FIG. 6, and the difference is that the active noise cancellation integrated circuit 110 is used for stacking at least one anti-noise signal and at least one non-anti-noise signal, and includes the non-ANC filtering unit 1103 that takes the place of the first ANC filtering unit 203 shown in FIG. 6. In the embodiment in FIG. 13, a signal provided by the first microphone 201 is processed to achieve the effect of decoupling. Hence, the first decoupling unit 60 receives the non-anti-noise signal $y'_1(n)$ output from the non-ANC filtering unit 1103 rather than the first anti-noise signal $y'_1(n)$ output from the first ANC filtering unit 203. Specifically, the third ANC filtering unit 601 receives the non-anti-noise signal $y'_1(n)$ output by the non-ANC filtering unit 1103, and outputs the third anti-noise signal $y'_1(n)\ W_2$. Furthermore, the second input port of the first adder circuit 603 receives the non-anti-noise signal $y'_1(n)$ output from the non-ANC filtering unit 1103 rather than the first anti-noise signal $y'_1(n)$ output from the first ANC filtering unit 203.

Furthermore, the operation of the third ANC filtering unit 601 is similar to that of the third ANC filtering unit 502 in FIG. 12. The difference is that the non-anti-noise signal $y'_1(n)$ in the embodiment of FIG. 12 is first processed by the first channel simulation filter 501, and then processed by the third ANC filtering unit 502. In this embodiment, the non-anti-noise signal $y'_1(n)$ is first processed by the third ANC filtering unit 601 and then processed by the channel simulation filter 602. According to the mathematical principle of the linear system, the abovementioned difference in the configuration sequence does not substantially lead to the change of the result. The detail description is omitted. Accordingly, in some embodiments, the non-anti-noise signal $y'_1(n)$ can be configured to be processed by the channel simulation filter 602 first, and then in turn processed by the third ANC filtering unit 601.

The first input port of the first adder circuit 603 receives the first decoupling signal $\hat{y}_1(n)\ W_2$, the second input port of the first adder circuit 603 receives the non-anti-noise signal $y'_1(n)$, and one of the two signals is subtracted from the other of the two signals. Then, the subtracted signal and a signal on the path of the second ANC filtering unit 204 are interfered with each other through the second adder circuit 604 to eliminate the component of the first signal $y_1(n)$ from the anti-noise signal $[d\ (n)+y_1(n)+y_2(n)]\ W_2$ output by the second ANC filtering unit 204. Specifically, the component $\hat{y}_1(n)W_2$ in the signal $[y'_1(n)-\hat{y}_1(n)W_2]$ output by the first adder circuit 603 is used to cancel the component $[y_1(n)\ W_2]$ in the anti-noise signal $[d(n)+y_1(n)+y_2(n)]W_2$ output by the second ANC filtering unit 204. Moreover, the primary noise signal $d(n)$ in the anti-noise signal $[d(n)+y_1(n)+y_2(n)]W_2$ can be ignored. Accordingly, the signal output by the second adder circuit 604 is $[y_2(n)W_2+y'_1(n)]$, which can be further simplified as $[y'_2(n)+y'_1(n)]$. Since the first signal $y_1(n)$ (which is derived from passing the non-anti-noise signal $y'_1(n)$ through the physical channel 205) is removed from the second path through the first decoupling unit 60, the intended purpose of the non-ANC filtering unit 1103 can be achieved by mitigating or cancelling the side effect caused by the second ANC filtering unit 204. That is, the feedback ANC does not cause loss of the first signal $y_1(n)$, and the intended purpose of the non-ANC filtering unit 1103 can be achieved without performance degradation.

The present invention has no limitations on the non-ANC filtering unit 1103. The non-ANC filtering unit 1103 may be set by any suitable non-ANC filter needed by an application. For example, the non-ANC filtering unit 1103 may be an HA filter with a weighting labeled as $W_{HA}$. For another example, the non-ANC filtering unit 1103 may be a PT filter with a weighting labeled as $W_{PT}$. For yet another example, the non-ANC filtering unit 1103 may be a PSAP filter with a weighting labeled as $W_{PSAP}$.

The active noise cancellation integrated circuit 110 shown in FIG. 13 and the active noise cancellation integrated circuit 20 shown in FIG. 6 have the same circuit architecture except generation of the filter output $y'_1(n)$. As a person skilled in the art can readily understand the mathematical principle of the active noise cancellation integrated circuit 110 shown in FIG. 13 after reading above paragraphs directed to the active noise cancellation integrated circuit 20 shown in FIG. 6, further description is omitted here for brevity.

In the abovementioned embodiments, in-ear headphone is taken as an example. Since the in-ear headphone has a good isolation effect between the internal microphone and the external microphone, the noise received by the internal microphone cannot be received by the external microphone. Therefore, in the abovementioned embodiments, echo noise cannot affect the first microphone 201. The following embodiment is an example without having good isolation.

Figure 14:
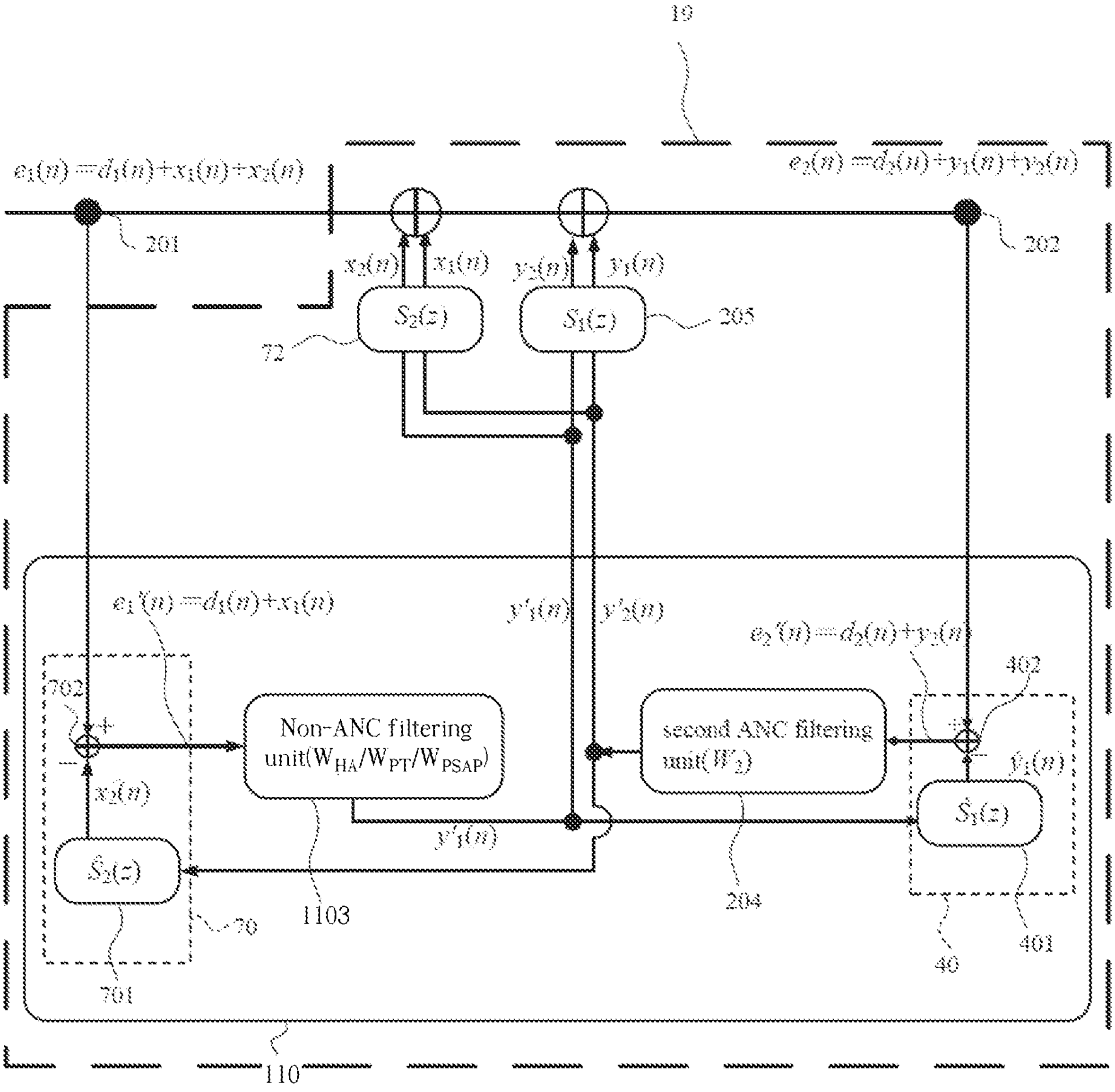
FIG. 14 illustrates a block diagram depicting an equivalent sampling time of an active noise cancellation headphone without good isolation between an ear canal and environment according to a preferred embodiment of the present invention.

FIG. 14 illustrates a block diagram depicting an equivalent sampling time of an active noise cancellation headphone without good isolation between an ear canal and environment according to a preferred embodiment of the present invention. The active noise cancellation headphone in FIG. 14 is similar to the active noise cancellation headphone in FIG. 7, and the difference is that the active noise cancellation integrated circuit 110 is used for stacking at least one anti-noise signal and at least one non-anti-noise signal, and includes the non-ANC filtering unit 1103 that takes the place of the first ANC filtering unit 203 shown in FIG. 7.

Referring to FIG. 14, in this embodiment, the active noise cancellation headphone is semi-in-ear headphone. Since a headphone shell 19 of this type of active noise cancellation headphone cannot effectively block sound passing from the inside of the active noise cancellation headphone to the outside of the active noise cancellation headphone, the first microphone 201 disposed outside of the headphone would be interfered by the echo noise inside the ear canal. Therefore, in addition to the first decoupling unit 40, the active noise cancellation device of the above-mentioned active noise cancellation headphone system further includes the second decoupling unit 70 whose function is similar to that of the first decoupling unit 40.

This embodiment has the same concept as the aforementioned several embodiments. The first decoupling unit 40 is used for generating a first decoupling signal according to a non-anti-noise signal output by the non-ANC filtering unit 1103. Similarly, the second decoupling unit 70 is used for generating a second decoupling signal according to an anti-noise signal output by the second ANC filtering unit 204.

The first decoupling signal $\hat{y}_1(n)$ is substantially equal to the first signal $y_1(n)$. The first error signal $e_2(n)$ received by the second microphone 202 is $[d_2(n)+y_1(n)+y_2(n)]$. Next, the first decoupling signal $\hat{y}_1(n)$ deducts the $y_1(n)$ component from the first error signal $e_2(n)$, and outputs the deducted first error signal $e_2(n)$ (hereinafter, a signal $e_2'(n)$) to the second ANC filtering unit 204. The signal $e_2'(n)$ received by the second ANC filtering unit 204 is substantially equal to $d_2(n)+y_2(n)$. In other words, the second ANC filtering unit 204 is no longer interfered by the first signal $y_1(n)$.

The second decoupling unit 70 includes the second channel simulation filter 701 and the second adder circuit 702. The second channel simulation filter 701 receives the second anti-noise signal $y'_2(n)$ output by the second ANC filtering unit 204 to generate the second decoupling signal $x\hat{\ }_2(n)$. The second decoupling signal $x\hat{\ }_2(n)$ is substantially equal to the signal $x_2(n)$. Next, the component of the signal $x_2(n)$ in the second error signal $e_1(n)$ is removed, and the removed second error signal $e_1(n)$ (hereinafter, a signal $e_1'(n)$) is output to the non-ANC filtering unit 1103. The signal $e_1'(n)$ received by the non-ANC filtering unit 1103 is substantially equal to $d_1(n)+x_1(n)$. The non-ANC filtering unit 1103 is not interfered by the signal $x_2(n)$.

The present invention has no limitations on the non-ANC filtering unit 1103. The non-ANC filtering unit 1103 may be set by any suitable non-ANC filter needed by an application. For example, the non-ANC filtering unit 1103 may be an HA filter with a weighting labeled as $W_{HA}$. For another example, the non-ANC filtering unit 1103 may be a PT filter with a weighting labeled as $W_{PT}$. For yet another example, the non-ANC filtering unit 1103 may be a PSAP filter with a weighting labeled as $W_{PSAP}$.

The active noise cancellation integrated circuit 110 shown in FIG. 14 and the active noise cancellation integrated circuit 20 shown in FIG. 7 have the same circuit architecture except generation of the filter output $y'_1(n)$. As a person skilled in the art can readily understand the mathematical principle of the active noise cancellation integrated circuit 110 shown in FIG. 14 after reading above paragraphs directed to the active noise cancellation integrated circuit 20 shown in FIG. 7, further description is omitted here for brevity.

Figure 15:
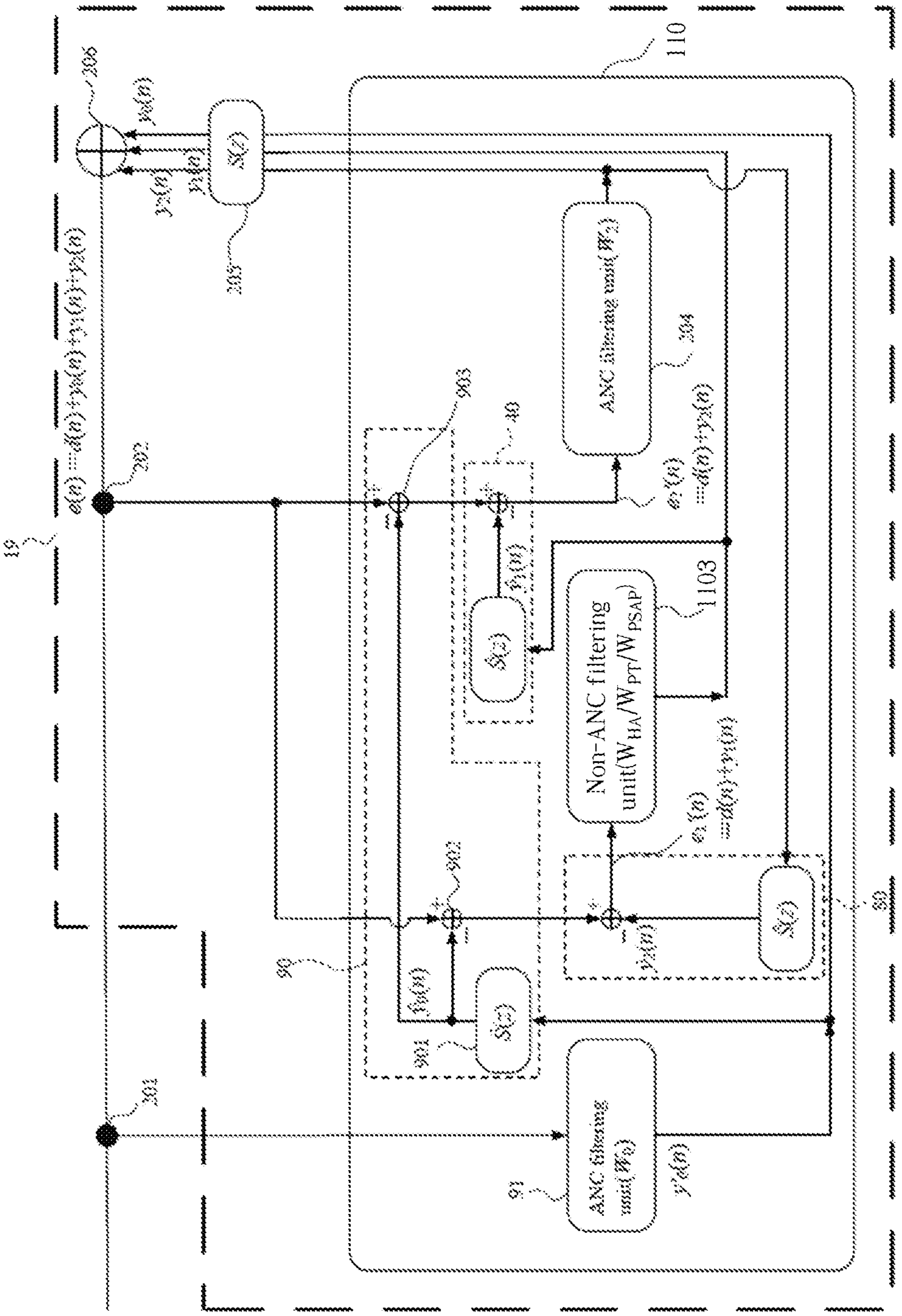
FIG. 15 illustrates a block diagram depicting an equivalent sampling time of an active noise cancellation headphone with good isolation between the ear canal and environment according to a preferred embodiment of the present invention.

FIG. 15 illustrates a block diagram depicting an equivalent sampling time of an active noise cancellation headphone with good isolation between an ear canal and environment according to a preferred embodiment of the present invention. The active noise cancellation headphone in FIG. 15 is similar to the active noise cancellation headphone in FIG. 9, and the difference is that the active noise cancellation integrated circuit 110 is used for stacking at least one anti-noise signal and at least one non-anti-noise signal, and includes the non-ANC filtering unit 1103 that takes the place of the first ANC filtering unit 203 shown in FIG. 9. Hence, in this embodiment, the first decoupling unit 40 receives the non-anti-noise signal $y'_1(n)$ output from the non-ANC filtering unit 1103 rather than the first anti-noise signal $y'_1(n)$ output from the first ANC filtering unit 203, and the physical channel 205 transmits the non-anti-noise signal $y'_1(n)$ output from the non-ANC filtering unit 1103 rather than the first anti-noise signal $y'_1(n)$ output from the first ANC filtering unit 203.

For the non-ANC filtering unit 1103, the channel simulation filter 901 and the adder circuit 902 in the third decoupling unit 90 are used to eliminate the interference of the signal $y_0(n)$ (which is derived from passing the third anti-noise signal $y'_0(n)$ through the physical channel 205), and the second decoupling unit 80 is used to eliminate the interference of the signal $y_2(n)$ (which is derived from passing the second anti-noise signal $y'_2(n)$ through the physical channel 205). For the second ANC filtering unit 204, the channel simulation filter 901 and the adder circuit 903 in the third decoupling unit 90 are used to eliminate the interference of the signal $y_0(n)$ (which is derived from passing the third anti-noise signal $y'_0(n)$ through the physical channel 205), and the first decoupling unit 40 is used to eliminate the interference of the signal $y_1(n)$ (which is derived from passing the non-anti-noise signal $y'_1(n)$ through the physical channel 205).

The present invention has no limitations on the non-ANC filtering unit 1103. The non-ANC filtering unit 1103 may be set by any suitable non-ANC filter needed by an application. For example, the non-ANC filtering unit 1103 may be an HA filter with a weighting labeled as $W_{HA}$. For another example, the non-ANC filtering unit 1103 may be a PT filter with a weighting labeled as $W_{PT}$. For yet another example, the non-ANC filtering unit 1103 may be a PSAP filter with a weighting labeled as $W_{PSAP}$.

The active noise cancellation integrated circuit 110 shown in FIG. 15 and the active noise cancellation integrated circuit 20 shown in FIG. 9 have the same circuit architecture except generation of the filter output $y'_1(n)$. As a person skilled in the art can readily understand the mathematical principle of the active noise cancellation integrated circuit 110 shown in FIG. 15 after reading above paragraphs directed to the active noise cancellation integrated circuit 20 shown in FIG. 9, further description is omitted here for brevity.

Figure 16:
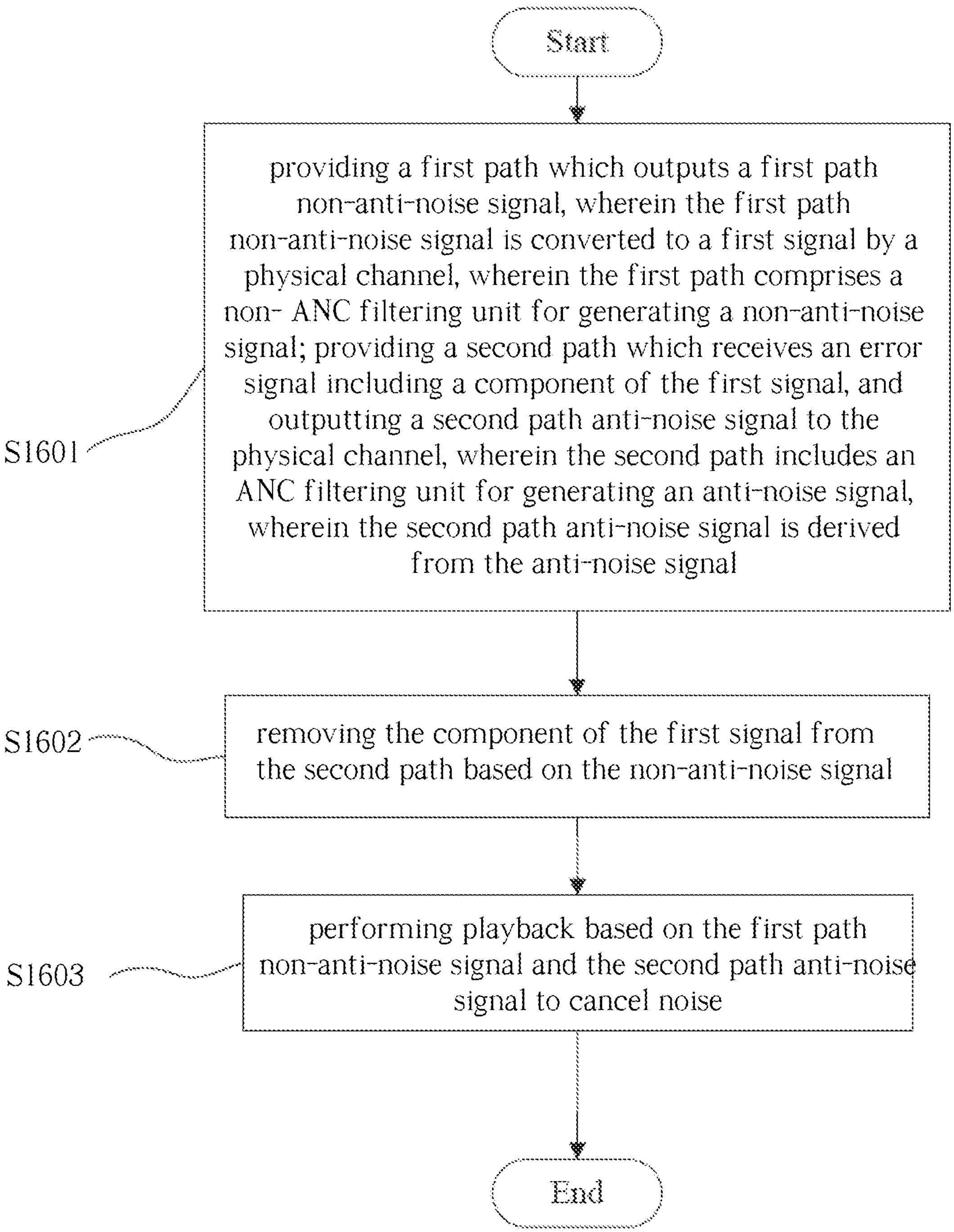
FIG. 16 illustrates a flowchart depicting an active noise cancellation method for stacking at least one anti-noise signal and at least one non-anti-noise signal according to a preferred embodiment of the present invention.

FIG. 16 illustrates a flowchart depicting an active noise cancellation method for stacking at least one anti-noise signal and at least one non-anti-noise signal according to a preferred embodiment of the present invention. Referring to FIG. 16, the active noise cancellation method for stacking at least one anti-noise signal and at least one non-anti-noise signal includes the steps as follow.

In step S1601, a first path is provided, and a first path non-anti-noise signal is output, wherein the first path non-anti-noise signal is converted to a first signal by a physical channel, wherein the first path includes a non-ANC filtering unit for generating a non-anti-noise signal. A second path is provided. The second path receives an error signal including a component of the first signal, and outputs a second path anti-noise signal to the physical channel, wherein the second path includes an ANC filtering unit for generating an anti-noise signal, and wherein the second path anti-noise signal is derived from the anti-noise signal.

In step S1602, the component of the first signal is removed from the second path based on the non-anti-noise signal. As shown in FIG. 11, at an input of the second ANC filtering unit 204, the first signal $y_1(n)$ is, based on the non-anti-noise signal and by means of the first channel simulation filter 401, removed from the error signal e(n) to be received by the second ANC filtering unit 204. As shown in FIG. 12, based on the non-anti-noise signal and by means of the first channel simulation filter 501 and the third ANC filtering unit 502, which has the same transfer function as the second ANC filtering unit, a decoupling signal is generated, and the decoupling process is applied at an output terminal of the second ANC filtering unit 204. As shown in FIG. 13, based on the non-anti-noise signal and by means of the channel simulation filter 602 and the third ANC filtering unit 601, which has the same transfer function as the second ANC filtering unit, a decoupling signal is generated, and the decoupling process is applied at an output of the second ANC filtering unit 204. As shown in FIG. 14, at an input of the second ANC filtering unit 204, the first signal $y_1(n)$ is, based on the non-anti-noise signal and by means of the first channel simulation filter 401, removed from the first error signal $e_2(n)$ to be received by the second ANC filtering unit 204; and at an input of the non-ANC filtering unit 1103, the signal $x_2(n)$ is, based on the anti-noise signal and by means of the second channel simulation filter 701, removed from the second error signal $e_2(n)$ to be received by the non-ANC filtering unit 1103.

In step S1603, a playback is performed based on the first path non-anti-noise signal and the second path anti-noise signal to cancel noise.

Although the embodiment has been described as having specific components in FIGS. 1 to 9 and FIGS. 11-15, it should be noted that additional components may be included to achieve better performance without departing from the spirit of the invention. Each steps of FIGS. 10 and 16 is arranged in a specific order to perform the aforementioned operations. However, under the circumstance that does not violate the spirit of the invention, those skilled in the art can modify the sequence of these steps on the premise of achieving the same effect. Thus, the present invention is not limited thereto. Further, people having ordinary skill in the art should be apparent that these processes can include more or fewer operations, which can be executed serially or in parallel (e.g., using parallel processors or a multi-threading environment). Therefore, the present invention is not limited thereto.

Figure 17:
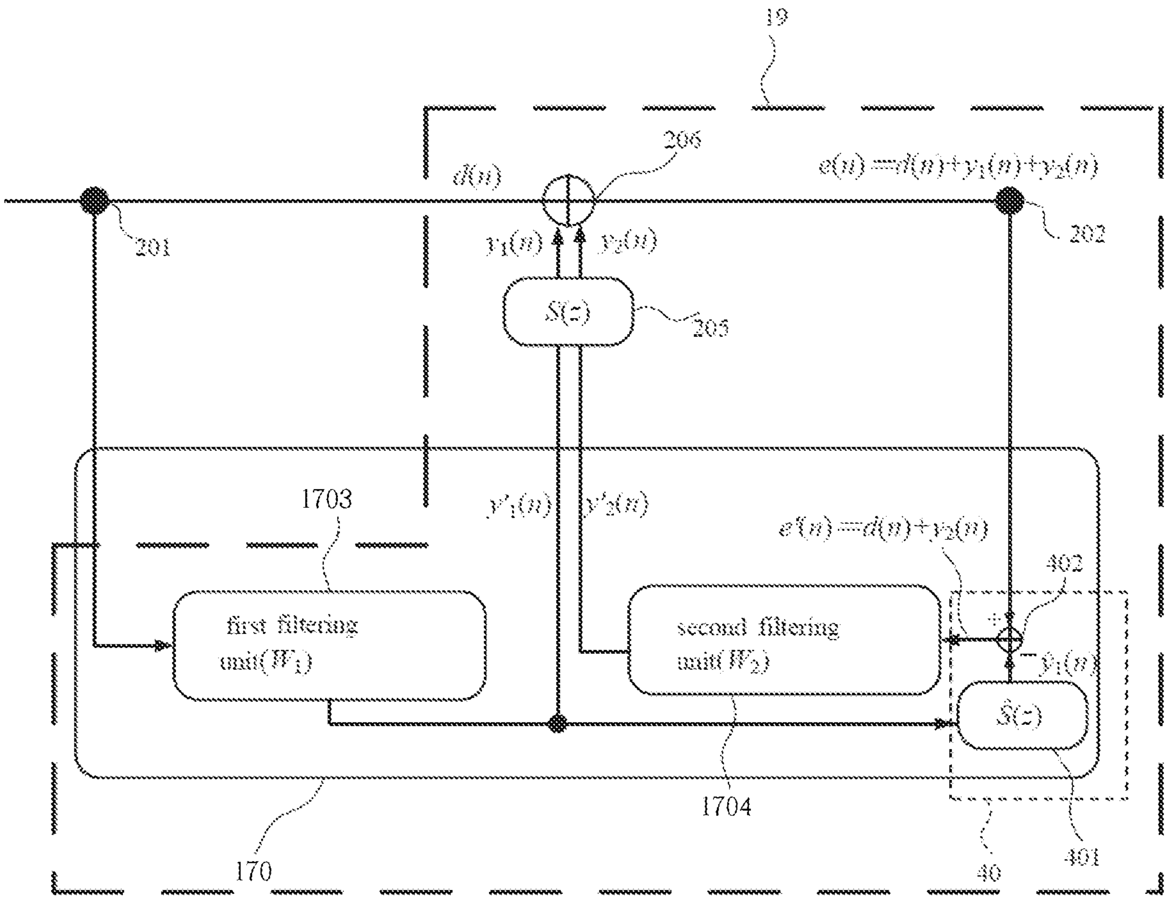
FIG. 17 illustrates a block diagram depicting an equivalent sampling time of an active noise cancellation headphone between the ear canal and environment according to a preferred embodiment of the present invention.

In above embodiments, an active noise cancellation integrated circuit may apply the proposed decoupling technique to a combination of multiple ANC filters, or may apply the proposed decoupling technique to a combination of non-ANC filter(s) and ANC filter(s). In practice, the same decoupling concept for interference mitigation or performance enhancement may be applied to any combination of filters employed by an active noise cancellation integrated circuit. FIG. 17 illustrates a block diagram depicting an equivalent sampling time of an active noise cancellation headphone between the ear canal and environment according to a preferred embodiment of the present invention. The active noise cancellation headphone in FIG. 17 is similar to the active noise cancellation headphone in FIG. 4, and the difference is that the active noise cancellation integrated circuit 170 includes a first filtering unit 1703 and a second filtering unit 1704, where the first filtering unit 1703 takes the place of the first ANC filtering unit 203 shown in FIG. 4, and the second filtering unit 1704 takes the place of the second ANC filtering unit 204 shown in FIG. 4. Each of the first filtering unit 1703 and the second filtering unit 1704 may be set by any suitable digital filter, depending upon actual design considerations. As a person skilled in the art can readily understand the mathematical principle of the active noise cancellation integrated circuit 170 shown in FIG. 17 after reading above paragraphs directed to the active noise cancellation integrated circuit 20 shown in FIG. 4 (or the active noise cancellation integrated circuit 110 shown in FIG. 11), further description is omitted here for brevity.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An active noise cancellation integrated circuit for stacking at least one anti-noise signal and at least one non-anti-noise signal, comprising:

- a first path, outputting a first path non-anti-noise signal, wherein the first path non-anti-noise signal is converted into a first signal by a physical channel, wherein the first path comprises:
  - a non active noise cancellation (non-ANC) filtering unit, for generating a non-anti-noise signal;
- a second path, receiving an error signal comprising a component of the first signal, and outputting a second path anti-noise signal to the physical channel, wherein the second path comprises:
  - an ANC filtering unit, for generating an anti-noise signal, wherein the second path anti-noise signal is derived from the anti-noise signal; and
- a first decoupling unit, for removing the component of the first signal from the second path based on the non-anti-noise signal.

2. The active noise cancellation integrated circuit for stacking at least one anti-noise signal and at least one non-anti-noise signal according to claim 1, wherein the first decoupling unit comprises:

a first channel simulation filter, for simulating the physical channel, receiving the non-anti-noise signal to generate a first decoupling signal; and a first adder circuit, comprising a first input port and a second input port and an output port, wherein the first input port of the first adder circuit receives the first decoupling signal, the second input port of the first adder circuit receives the error signal, and the output port of the first adder circuit is coupled to the second ANC filtering unit.

3. The active noise cancellation integrated circuit for stacking at least one anti-noise signal and at least one non-anti-noise signal according to claim 1, wherein the first decoupling unit comprises:

a first channel simulation filter, for simulating the physical channel, receiving the non-anti-noise signal to generate a first decoupling signal; and another ANC filtering unit, wherein a filtering operation of the another ANC filtering unit is substantially equal to a filtering operation of the ANC filtering unit, wherein the another ANC filtering unit receives the first decoupling signal to generate another anti-noise signal;

a first adder circuit, comprising a first input port and a second input port and an output port, wherein the first input port of the first adder circuit receives the another anti-noise signal, and the second input port of the first adder circuit receives the anti-noise signal; and a second adder circuit, comprising a first input port and a second input port and an output port, wherein the first input port of the second adder circuit is coupled to the output port of the first adder circuit, and the second input port of the second adder circuit receives the non-anti-noise signal, wherein the non-anti-noise signal, the anti-noise signal and the first decoupling signal are synthesized into a noise cancellation signal by signal superposition performed by the first adder circuit and the second adder circuit.

4. The active noise cancellation integrated circuit for stacking at least one anti-noise signal and at least one non-anti-noise signal according to claim 1, wherein the first decoupling unit comprises:

another ANC filtering unit, wherein a filtering operation of the another ANC filtering unit is substantially equal to a filtering operation of the ANC filtering unit, wherein the another ANC filtering unit receives the non-anti-noise signal to generate another anti-noise signal;

a first channel simulation filter, for simulating the physical channel, receiving the another anti-noise signal to generate a first decoupling signal;

a first adder circuit, comprising a first input port and a second input port and an output port, wherein the first input port of the first adder circuit receives the first decoupling signal, and the second input port of the first adder circuit receives the non-anti-noise signal; and a second adder circuit, comprising a first input port, a second input port and a output port, wherein the first input port of the second adder circuit is coupled to the output port of the first adder circuit, and the second input port of the second adder circuit receives the anti-noise signal, wherein the non-anti-noise signal, the anti-noise signal and the first decoupling signal are synthesized into a noise cancellation signal by signal superposition performed by the first adder circuit and the second adder circuit.

5. The active noise cancellation integrated circuit for stacking at least one anti-noise signal and at least one non-anti-noise signal according to claim 1, wherein the physical channel is a first physical channel, wherein the second path anti-noise signal is converted to a second signal by a second physical channel, wherein the error signal is a first error signal, wherein the first path receives a second error signal which comprises a component of the second signal, wherein the active noise cancellation integrated circuit further comprises:

a second decoupling unit, for removing the component of the second signal from the first path based on the anti-noise signal.

6. The active noise cancellation integrated circuit for stacking at least one anti-noise signal and at least one non-anti-noise signal according to claim 1, wherein the second path anti-noise signal is converted to a second signal by the physical channel, the error signal comprises a component of the second signal and a component of a third signal, the first path receives the error signal, and the active noise cancellation integrated circuit further comprises:

a second decoupling unit, for removing the component of the second signal from the first path based on the second anti-noise signal; and a third path, outputting a third path anti-noise signal, wherein the third path anti-noise signal is converted to the third signal by the physical channel, and the third path comprises:

a third ANC filtering unit, for generating a third anti-noise signal; and a third decoupling unit, for removing the component of the third signal from the second path based on the third anti-noise signal, and for further removing the component of the third signal from the first path based on the third anti-noise signal.

7. The active noise cancellation integrated circuit for stacking at least one anti-noise signal and at least one non-anti-noise signal according to claim 1, wherein the non-ANC filtering unit is a hearing aid (HA) filter.

8. The active noise cancellation integrated circuit for stacking at least one anti-noise signal and at least one non-anti-noise signal according to claim 1, wherein the non-ANC filtering unit is a pass-through (PT) filter.

9. The active noise cancellation integrated circuit for stacking at least one anti-noise signal and at least one non-anti-noise signal according to claim 1, wherein the non-ANC filtering unit is a personal sound amplification (PSAP) filter.

10. An active noise cancellation method for stacking at least one anti-noise signal and at least one non-anti-noise signal, applicable to an audio playback device with at least one active noise cancellation (ANC) filtering unit and at least one non-ANC filtering unit, wherein the active noise cancellation method for stacking at least one anti-noise signal and at least one non-anti-noise signal comprises:

providing a first path which outputs a first path non-anti-noise signal, wherein the first path non-anti-noise signal is converted to a first signal by a physical channel, wherein the first path comprises a non-ANC filtering unit for generating a non-anti-noise signal;

providing a second path which receives an error signal with a component of the first signal, and outputs a second path anti-noise signal to the physical channel, wherein the second path comprises an ANC filtering unit for generating an anti-noise signal, wherein the second path anti-noise signal is derived from the anti-noise signal;

removing the component of the first signal from the second path based on the non-anti-noise signal; and performing playback based on the first path non-anti-noise signal and the second path anti-noise signal to eliminate noise.

11. The active noise cancellation method for stacking at least one anti-noise signal and at least one non-anti-noise signal according to claim 10, wherein removing the component of the first signal from the second path based on the non-anti-noise signal comprises:

converting the non-anti-noise signal to a decoupling signal according to the physical channel; and performing a decoupling operation through the decoupling signal at an input terminal of the ANC filtering unit to remove the component of the first signal from the second path.

12. The active noise cancellation method for stacking at least one anti-noise signal and at least one non-anti-noise signal according to claim 10, wherein removing the component of the first signal from the second path based on the non-anti-noise signal comprises:

generating a decoupling signal according to the physical channel and a transfer function of the ANC filtering unit; and performing a decoupling operation through the decoupling signal at an output terminal of the ANC filtering unit to remove the component of the first signal from the second path.

13. An active noise cancellation headphone, comprising:

an active noise cancellation (ANC) integrated circuit for stacking at least one anti-noise signal and at least one non-anti-noise signal, comprising:

a first path, outputting a first path non-anti-noise signal, wherein the first path non-anti-noise signal is converted into a first signal by a physical channel, wherein the first path comprises:

a non-ANC filtering unit, for generating a non-anti-noise signal;

a second path, receiving an error signal comprising a component of the first signal, and outputting a second path anti-noise signal to the physical channel, wherein the second path comprises:

an ANC filtering unit, for generating an anti-noise signal, wherein the second path anti-noise signal is derived from the anti-noise signal; and a first decoupling unit, for removing the component of the first signal from the second path based on the non-anti-noise signal; and an audio-to-electrical signal conversion device, comprising:

a speaker, for playback based on the first path non-anti-noise signal and the second path anti-noise signal to eliminate noise, wherein the speaker is a portion of the physical channel; and a microphone, for receiving a noise of an ear canal echo and converting the noise into the error signal.

14. The active noise cancellation headphone according to claim 13, wherein the first decoupling unit comprises:

a first channel simulation filter, for simulating the physical channel, receiving the non-anti-noise signal to generate a first decoupling signal; and a first adder circuit, comprising a first input port and a second input port and an output port, wherein the first input port of the first adder circuit receives the first decoupling signal, the second input port of the first adder circuit receives the error signal, and the output port of the first adder circuit is coupled to the second ANC filtering unit.

15. The active noise cancellation headphone according to claim 13, wherein the first decoupling unit comprises:

a first channel simulation filter, for simulating the physical channel, receiving the non-anti-noise signal to generate a first decoupling signal; and another ANC filtering unit, wherein a filtering operation of the another ANC filtering unit is substantially equal to a filtering operation of the ANC filtering unit, wherein the another ANC filtering unit receives the first decoupling signal to generate another anti-noise signal;

a first adder circuit, comprising a first input port and a second input port and an output port, wherein the first input port of the first adder circuit receives the another anti-noise signal, and the second input port of the first adder circuit receives the anti-noise signal; and a second adder circuit, comprising a first input port and a second input port and an output port, wherein the first input port of the second adder circuit is coupled to the output port of the first adder circuit, and the second input port of the second adder circuit receives the non-anti-noise signal, wherein the non-anti-noise signal, the anti-noise signal and the first decoupling signal are synthesized into a noise cancellation signal by signal superposition performed by the first adder circuit and the second adder circuit.

16. The active noise cancellation headphone according to claim 13, wherein the first decoupling unit comprises:

another ANC filtering unit, wherein a filtering operation of the another ANC filtering unit is substantially equal to a filtering operation of the ANC filtering unit, wherein the another ANC filtering unit receives the non-anti-noise signal to generate another anti-noise signal;

a first channel simulation filter, for simulating the physical channel, receiving the another anti-noise signal to generate a first decoupling signal;

a first adder circuit, comprising a first input port and a second input port and an output port, wherein the first input port of the first adder circuit receives the first decoupling signal, the and second input port of the first adder circuit receives the non-anti-noise signal; and a second adder circuit, comprising a first input port, a second input port and a output port, wherein the first input port of the second adder circuit is coupled to the output port of the first adder circuit, and the second input port of the second adder circuit receives the anti-noise signal, wherein the non-anti-noise signal, the anti-noise signal and the first decoupling signal are synthesized into a noise cancellation signal by signal superposition performed by the first adder circuit and the second adder circuit.

17. The active noise cancellation headphone according to claim 13, wherein the physical channel is a first physical channel, wherein the second path anti-noise signal is converted to a second signal by a second physical channel, wherein the error signal is a first error signal, wherein the first path receives a second error signal which comprises a component of the second signal, wherein the active noise cancellation integrated circuit further comprises:

a second decoupling unit, for removing the component of the second signal from the first path based on the anti-noise signal.

18. The active noise cancellation headphone according to claim 13, wherein the non-ANC filtering unit is a hearing aid (HA) filter.

19. The active noise cancellation headphone according to claim 13, wherein the non-ANC filtering unit is a pass-through (PT) filter.

20. The active noise cancellation headphone according to claim 13, wherein the non-ANC filtering unit is a personal sound amplification (PSAP) filter.

* * * * *